US011860491B2

(12) United States Patent
Zhang et al.

(10) Patent No.: US 11,860,491 B2
(45) Date of Patent: Jan. 2, 2024

(54) DISPLAY PANEL, PREPARATION METHOD THEREOF, AND DISPLAY APPARATUS

(71) Applicant: BOE Technology Group Co., Ltd., Beijing (CN)

(72) Inventors: Zhao Zhang, Beijing (CN); Yanqing Chen, Beijing (CN); Wei Li, Beijing (CN); Weida Qin, Beijing (CN); Kai Chen, Beijing (CN); Jiguo Wang, Beijing (CN); Wei Yan, Beijing (CN); Xiaofeng Zhang, Beijing (CN); Zeliang Li, Beijing (CN); Jian Zhang, Beijing (CN); Zhen Wang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/950,131

(22) Filed: Sep. 22, 2022

(65) Prior Publication Data
US 2023/0017000 A1    Jan. 19, 2023

Related U.S. Application Data

(63) Continuation-in-part of application No. 17/509,080, filed on Oct. 25, 2021, now Pat. No. 11,493,798.

(30) Foreign Application Priority Data

Feb. 26, 2021  (CN) .......................... 202110220239.X
Sep. 16, 2022  (CN) .......................... 202211130781.7

(51) Int. Cl.
G02F 1/1362  (2006.01)
G02F 1/1335  (2006.01)
(Continued)

(52) U.S. Cl.
CPC ...... *G02F 1/136209* (2013.01); *G02F 1/1341* (2013.01); *G02F 1/13338* (2013.01);
(Continued)

(58) Field of Classification Search
None
See application file for complete search history.

(56) References Cited

U.S. PATENT DOCUMENTS 6,373,540 B1    4/2002  Munakata
2001/0050729 A1  12/2001  Kim et al.
(Continued)

FOREIGN PATENT DOCUMENTS

EP    1933181 A1 *  6/2008  ........... G02B 5/3033

OTHER PUBLICATIONS

Notice of Allowance dated Jun. 23, 2022 for U.S. Appl. No. 17/509,080.

*Primary Examiner* — Shan Liu
(74) *Attorney, Agent, or Firm* — Ling Wu; Stephen Yang; Ling and Yang Intellectual Property

(57) ABSTRACT

A display panel includes a second substrate. The second substrate includes a second base substrate and a shielding layer, an array structure layer, an insulating layer and a reflective layer which are sequentially disposed on a second base substrate, the array structure layer includes gate lines; the shielding layer includes a plurality of groups of light shielding units sequentially arranged along a first direction, each group of the light shielding units includes a plurality of independent sub-light shielding units sequentially arranged along a second direction, the reflective layer includes a plurality of reflective units arranged in an array, the plurality of reflective units form a plurality of reflective rows and a plurality of reflective columns, a first space area is formed (Continued)

between adjacent reflective columns, and a second space area is formed between adjacent reflective rows forms.

16 Claims, 18 Drawing Sheets

(51) Int. Cl.
*G02F 1/13363* (2006.01)
*G02F 1/1333* (2006.01)
*G02F 1/1343* (2006.01)
*G02F 1/1341* (2006.01)
*G06F 3/041* (2006.01)
*G06F 3/044* (2006.01)
*G02F 1/1339* (2006.01)

(52) U.S. Cl.
CPC .. *G02F 1/133354* (2021.01); *G02F 1/133531* (2021.01); *G02F 1/133553* (2013.01); *G02F 1/133638* (2021.01); *G02F 1/134309* (2013.01); *G02F 1/136286* (2013.01); *G06F 3/0412* (2013.01); *G06F 3/0443* (2019.05); *G06F 3/0446* (2019.05); *G02F 1/13392* (2013.01); *G02F 1/133345* (2013.01); *G02F 2202/28* (2013.01); *G02F 2203/09* (2013.01); *G02F 2413/02* (2013.01); *G02F 2413/03* (2013.01); *G02F 2413/05* (2013.01); *G02F 2413/06* (2013.01); *G06F 2203/04103* (2013.01); *G06F 2203/04107* (2013.01)

(56) References Cited

U.S. PATENT DOCUMENTS

| | | |
|---|---|---|
| 2002/0008800 A1 | 1/2002 | Matsumoto et al. |
| 2004/0114075 A1 | 6/2004 | Iwasa |
| 2007/0296908 A1 | 12/2007 | Koyama |
| 2017/0052300 A1* | 2/2017 | Takeda .................. B32B 27/325 |
| 2017/0153492 A1* | 6/2017 | Hirosawa ........... G02F 1/133512 |
| 2019/0079329 A1* | 3/2019 | Li ...................... G02F 1/133553 |
| 2019/0384111 A1* | 12/2019 | Lee ................... G02F 1/133528 |
| 2020/0064698 A1 | 2/2020 | Li |
| 2021/0240024 A1* | 8/2021 | Oikawa ............... H01L 29/4925 |
| 2021/0242245 A1* | 8/2021 | Oikawa ............. G02F 1/136286 |

* cited by examiner

DISPLAY PANEL, PREPARATION METHOD THEREOF, AND DISPLAY APPARATUS

CROSS-REFERENCE TO RELATED APPLICATIONS

This application is a continuation-in-part of U.S. application Ser. No. 17/509,080, filed on Oct. 25, 2021, which claims the priority to Chinese Patent Application No. 202110220239.X, filed to the CNIPA on Feb. 26, 2021. This application also claims the priority to Chinese Patent Application No. 202211130781.7, filed to the CNIPA on Sep. 16, 2022. The contents of the above identified applications are hereby incorporated by reference.

TECHNICAL FIELD

Embodiments of the present disclosure relate to, but are not limited to, the field of display technology, and in particular, to a display panel, a preparation method thereof, and a display apparatus.

BACKGROUND

A Liquid Crystal Display (LCD) has characteristics of small size, low power consumption, and no radiation, and has been developed rapidly. A main structure of a LCD includes a Thin Film Transistor (TFT) array substrate of a cell (CELL) and a Color Filter (CF) substrate that are cell-assembled, Liquid Crystal (LC) molecules are filled between the array substrate and the color filter substrate, and a common electrode and a pixel electrode are controlled to form an electric field that drives deflection of liquid crystal, thereby achieving gray tone display.

According to different types of light sources adopted, LCDs may be divided into transmissive type, reflective type, and transflective type, among which transflective LCDs have advantages of transmissive LCDs and reflective LCDs. However, due to existence of color resistance mixing and an oblique electric field, color mixing occurs in a transmissive picture, and a color gamut is extremely low, which seriously affects image quality level and user experience adversely.

SUMMARY

The following is a summary of subject matters described in the present disclosure in detail. The summary is not intended to limit the scope of protection of claims.

An embodiment of the present disclosure provides a display panel, including: a first substrate and a second substrate disposed oppositely, and a liquid crystal layer sandwiched between the first substrate and the second substrate, wherein: the second substrate includes a second base substrate and a shielding layer, an array structure layer, an insulating layer and a reflective layer which are sequentially disposed on the second base substrate, wherein the array structure layer includes a gate electrode layer, and the gate electrode layer includes a plurality of gate lines; the shielding layer includes a plurality of groups of light shielding units sequentially arranged along a first direction, each group of the light shielding units includes a plurality of independent sub-light shielding units sequentially arranged along a second direction, wherein the first direction intersects with the second direction; the reflective layer includes a plurality of reflective units arranged in an array along the first direction and the second direction, the plurality of reflective units form a plurality of reflective rows and a plurality of reflective columns, a space area between adjacent reflective columns forms a first space area, and a space area between adjacent reflective rows forms a second space area; the first space area includes a first sub-region and a second sub-region, an orthographic projection of the first sub-region on the second base substrate is overlapped with an orthographic projection of a spacing area between two adjacent sub-light shielding units in each group on the second base substrate, and an orthographic projection of the second sub-region on the second base substrate is not overlapped with an orthographic projection of a space area between two adjacent sub-light shielding unit in each group on the second base substrate.

In an exemplary embodiment, an orthographic projection of at least one gate line on the second base substrate covers an orthographic projection of the first sub-region on the second base substrate, and an orthographic projection of the light shielding unit on the second base substrate covers an orthographic projection of the second sub-region on the second base substrate.

In an exemplary embodiment, a width of the first sub-region in the second direction is 2 µm to 4 µm.

In an exemplary embodiment, each of the light shielding units includes a first light shielding part and a second light shielding part, an orthographic projection of the first light shielding part on the second base substrate is not overlapped with an orthographic projection of the second space area on the second base substrate; an orthographic projection of the second light shielding part on the second base substrate is overlapped with the orthographic projection of the second space area on the second base substrate, and a width of the second light-shielding portion in the first direction is smaller than a width of the first light-shielding portion in the first direction.

In an exemplary embodiment, a width of the second light shielding part in the first direction is between 3 µm to 5 µm.

In an exemplary embodiment, a width of the first light shielding part in the first direction is between 5 µm to 8 µm.

In an exemplary embodiment, the first light shielding part includes a first edge and a second edge which are disposed oppositely to each other in the first direction, and the first space area includes a third edge and a fourth edge which are disposed opposite to each other in the first direction, and a space between the first edge of the first light shielding part and the third edge of the corresponding first space area is 0.8 µm to 1.5 µm, and a space between the second edge of the first light shielding part and the fourth edge of the corresponding first space area is 0.8 µm to 1.5 µm.

In an exemplary embodiment, the array structure layer further includes an active semiconductor layer and a source-drain electrode layer, wherein the source-drain electrode layer includes a source electrode and a drain electrode, the insulating layer is provided with a first via, and the reflective unit is connected to the drain electrode through the first via; the first substrate includes a first base substrate and a black matrix layer and a color filter layer which are sequentially disposed on the first base substrate; and at least one of the first substrate and the second substrate further includes a spacer; the black matrix layer includes at least one first black matrix and at least one second black matrix, an orthographic projection of the at least one first black matrix on the first base substrate covers an orthographic projection of the spacer on the first base substrate; an orthographic projection of the at least one second black matrix on the first base substrate covers an orthographic projection of the first via on the first base substrate.

In an exemplary embodiment, the first substrate further includes a first polarizer disposed on a side of the first substrate away from the second substrate, and the first polarizer includes a first quarter-wave plate, a second adhesive layer, a half-wave plate, a third adhesive layer, a first cellulose triacetate layer, a first poly vinyl alcohol layer, and a second cellulose triacetate layer which are stacked in sequence along a direction away from the second substrate, wherein an absorption axis angle of the first poly vinyl alcohol layer is n°, a slow axis angle of the half-wave plate is $((n+21)\%180)°$ to $((n+23)\%180)°$, a slow axis angle of the first quarter-wave plate is $((n+142)\%180)°$ to $((n+144)\%180)°$, and n is between 0 and 180.

In an exemplary embodiment, the second substrate further includes a second polarizer disposed on a side of the second substrate away from the first substrate, and the second polarizer includes a second quarter-wave plate, a fourth adhesive layer, a third cellulose triacetate layer, a second poly vinyl alcohol layer, and a fourth cellulose triacetate layer which are stacked in sequence along a direction away from the first substrate, wherein an absorption axis angle of the second poly vinyl alcohol layer is $((n+89)\%180)°$ to $((n+91)\%180)°$, and a slow axis angle of the second quarter-wave plate is $((n+139)\%180)°$ to $((n+141)\%180)°$.

In an exemplary embodiment, the display panel further includes a touch structure layer disposed on a side of the first substrate away from the second substrate; in a plane parallel to the display panel, the display panel includes a touch control area and a binding area located at the second direction side of the touch control area, the touch control area includes N electrode areas and N lead areas, the electrode area and the lead area both extend along the second direction, the electrode area and the lead area are alternately arranged along the first direction, each of the electrode areas includes M touch electrodes arranged sequentially along the second direction, each of the lead areas includes M touch traces arranged sequentially along the first direction, a first end of each of the touch traces is connected with one of the touch electrodes, and a second end extends to the binding area along the second direction, wherein both M and N are natural numbers greater than 1.

An embodiment of the present disclosure further provides a display panel, including: a first substrate and a second substrate disposed oppositely, and a liquid crystal layer sandwiched between the first substrate and the second substrate, wherein: the first substrate further includes a first polarizer disposed on a side of the first substrate away from the second substrate, and the first polarizer includes a first quarter-wave plate, a second adhesive layer, a half-wave plate, a third adhesive layer, a first cellulose triacetate layer, a first poly vinyl alcohol layer, and a second cellulose triacetate layer which are stacked in sequence along a direction away from the second substrate, wherein an absorption axis angle of the first poly vinyl alcohol layer is n°, a slow axis angle of the half-wave plate is $((n+21)\%180)°$ to $((n+23)\%180)°$, a slow axis angle of the first quarter-wave plate is $((n+142)\%180)°$ to $((n+144)\%180)°$, and n is between 0 and 180.

In an exemplary embodiment, the second substrate further includes a second polarizer disposed on a side of the second substrate away from the first substrate, and the second polarizer includes a second quarter-wave plate, a fourth adhesive layer, a third cellulose triacetate layer, a second poly vinyl alcohol layer, and a fourth cellulose triacetate layer which are stacked in sequence along a direction away from the first substrate, wherein an absorption axis angle of the second poly vinyl alcohol layer is $((n+89)\%180)°$ to $((n+101)\%180)°$, and a slow axis angle of the second quarter-wave plate is $((n+139)\%180)°$ to $((n+141)\%180)°$.

An embodiment of the present disclosure further provides a display apparatus, including the display panel according to any embodiment of the present disclosure.

An embodiment of the present disclosure further provides a preparation method of a display panel, including:

forming a first substrate and a second substrate respectively, wherein the second substrate includes a shielding layer, an array structure layer, an insulating layer and a reflective layer which are sequentially disposed on the second base substrate, wherein the array structure layer includes a gate electrode layer, and the gate electrode layer includes a plurality of gate lines; the shielding layer includes a plurality of groups of light shielding units sequentially arranged along a first direction, each group of the light shielding units includes a plurality of independent sub-light shielding units sequentially arranged along a second direction, the sub-light shielding units extends along the second direction extend, and the first direction intersects with the second direction; the reflective layer includes a plurality of reflective units arranged in an array along the first direction and the second direction, the plurality of reflective units form a plurality of reflective rows and a plurality of reflective columns, a space area between adjacent reflective columns forms a first space area, and a space area between adjacent reflective rows forms a second space area; the first space area includes a first sub-region and a second sub-region, an orthographic projection of the first sub-region on the second base substrate is overlapped with an orthographic projection of a spacing area between two adjacent sub-light shielding units in each group on the second base substrate, and an orthographic projection of the second sub-region on the second base substrate is not overlapped with an orthographic projection of a space area between two adjacent sub-light shielding unit in each group on the second base substrate;

cell-assembling the first substrate and the second substrate, and filling liquid crystal between the first substrate and the second substrate.

An embodiment of the present disclosure further provides a preparation method of a display panel, including:

forming a first substrate and a second substrate respectively;

cell-assembling the first substrate and the second substrate, and filling liquid crystal between the first substrate and the second substrate;

attaching a first polarizer to a side of the first substrate away from the second substrate, wherein the first polarizer includes a first quarter-wave plate, a second adhesive layer, a half-wave plate, a third adhesive layer, a first cellulose triacetate layer, a first poly vinyl alcohol layer, and a second cellulose triacetate layer which are stacked in sequence along a direction away from the second substrate, wherein an absorption axis angle of the first poly vinyl alcohol layer is n°, a slow axis angle of the half-wave plate is $((n+21)\%180)°$ to $((n+23)\%180)°$, a slow axis angle of the first quarter-wave plate is $((n+142)\%180)°$ to $((n+144)\%180)°$, and n is between 0 and 180.

Other features and advantages of the present disclosure will be described in the subsequent description, and, in part, become apparent from the description, or may be understood by implementing the present disclosure. Other advantages of the present disclosure may be implemented and achieved by solutions described in the specification and accompanying drawings.

Other aspects may be comprehended upon reading and understanding of the accompanying drawings and detailed descriptions.

BRIEF DESCRIPTION OF DRAWINGS

The accompanying drawings are used to provide an understanding of technical solutions of the present disclosure, constitute a part of the specification, and are used to explain, together with the embodiments of the present disclosure, the technical solutions of the present disclosure and are not intended to constitute a limitation to the technical solutions of the present disclosure.

DETAILED DESCRIPTION

Figure 1:
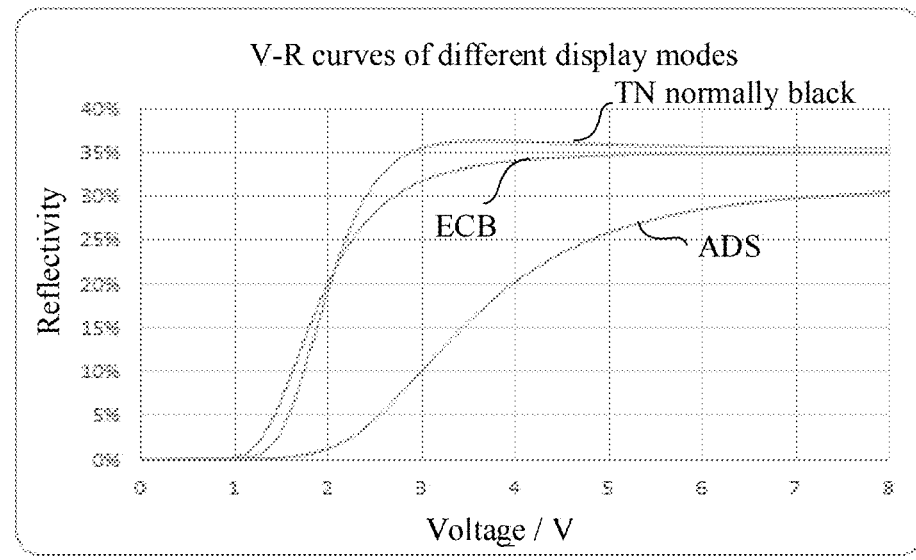
FIG. 1 is an optical simulation comparison diagram of different display modes.

Hereinafter, embodiments will be described with reference to the drawings. It should be noted that the embodiments may be implemented in many different forms. Those of ordinary skills in the art may readily understand a fact that implementation modes and contents may be transformed into a variety of forms without departing from the spirit and scope of the present disclosure. Therefore, the present disclosure should not be construed as being limited only to what is described in the following embodiments. The embodiments and features in the embodiments in the present disclosure may be combined randomly if there is no conflict.

In the drawings, a size of each constituent element, or a thickness or area of a layer, is sometimes exaggerated for clarity. Therefore, an implementation mode of the present disclosure is not necessarily limited to the size shown, and a shape and a size of each component in the drawings do not reflect true proportions. In addition, the drawings schematically show ideal examples, and an implementation of the present disclosure is not limited to the shapes or values shown in the drawings.

The ordinal numbers "first", "second", "third" and the like in this specification are used to avoid confusion between constituent elements, but not to constitute limitations on quantities.

In this specification, for sake of convenience, wordings, such as "central", "upper", "lower", "front", "rear", "vertical", "horizontal", "top", "bottom", "inner", "outer" and the like which are used to indicate orientation or positional relations, to describe the positional relations between constituent elements with reference to the drawings, are only for a purpose of facilitating description of this specification and simplifying the description, rather than indicating or implying that an apparatus or element referred to must have a specific orientation, or must be constructed and operated in a particular orientation, and therefore cannot be construed as limitations on the present disclosure. The positional relations of the constituent elements may be appropriately changed according to a direction in which each of the constituent elements is described. Therefore, the wordings are not limited in the specification, and may be replaced appropriately according to situations.

In this specification, terms "install", "connect", and "couple" shall be understood in a broad sense unless otherwise explicitly specified and defined. For example, it may be a fixed connection, or may be a detachable connection, or an integral connection; it may be a mechanical connection, or may be an electrical connection; it may be a direct connection, or may be an indirect connection through middleware, or may be an internal connection between two elements. Those of ordinary skills in the art may understand meanings of the terms in the present disclosure according to specific situations.

In this specification, a transistor refers to an element including at least three terminals, namely a gate electrode, a drain electrode, and a source electrode. The transistor has a channel area between the drain electrode (a drain electrode terminal, a drain area, or a drain electrode) and the source electrode (a source electrode terminal, a source area, or a source electrode), and a current may flow through the drain electrode, the channel area, and the source electrode. It should be noted that in this specification, the channel area refers to a area through which a current mainly flows.

In this specification, it may be a case that a first electrode is a drain electrode and a second electrode is a source electrode, or it may be a case that a first electrode is a source electrode and a second electrode is a drain electrode. Functions of a "source electrode" and a "drain electrode" are sometimes interchangeable in a case where transistors with opposite polarities are used or in a case where a direction of a current changes during circuit operation. Therefore, in this specification, a "source electrode" and a "drain electrode" are interchangeable.

In this specification, an "electrical connection" includes a case where constituent elements are connected together through an element having a certain electrical function. The "element having a certain electrical function" is not particularly limited as long as it may transmit and receive electrical signals between connected constituent elements. Examples of the "element having a certain electrical function" include not only electrodes and wirings, but also switching elements such as transistors, and include resistors, inductors, capacitors, and other elements having a plurality of functions.

In this specification, "parallel" refers to a state in which an angle formed by two straight lines is above −10 degrees and below 10 degrees, and thus also includes a state in which the angle is above −5 degrees and below 5 degrees. In addition, "perpendicular" refers to a state in which an angle formed by two straight lines is above 80 degrees and below 100 degrees, and thus may include a state in which the angle is above 85 degrees and below 95 degrees.

In this specification, a "film" and a "layer" may be interchangeable. For example, sometimes a "conductive layer" may be replaced by a "conductive film". Similarly, an "insulating film" may sometimes be replaced by an "insulating layer".

A transflective LCD has both a reflective mode and a transmissive mode, and is no longer restricted by an external environment, and reflection is dominant, and transmission is supplementary. In recent years, its demand in the fields of wearing and industrial control has been increasing. In positioning of a wearable product, low power consumption is an important product performance. In order to match this characteristic, a low voltage driving mode becomes a primary choice. FIG. 1 is an optical simulation comparison diagram of different display modes. Considering light efficiency of liquid crystal, a Twisted Nematic (TN) normally black mode has become a primary choice for low-voltage driving.

The transflective LCD generally includes the following structures.

1) There is no Black Matrix (BM) in a valid display area (Active Area).

Figure 2A:
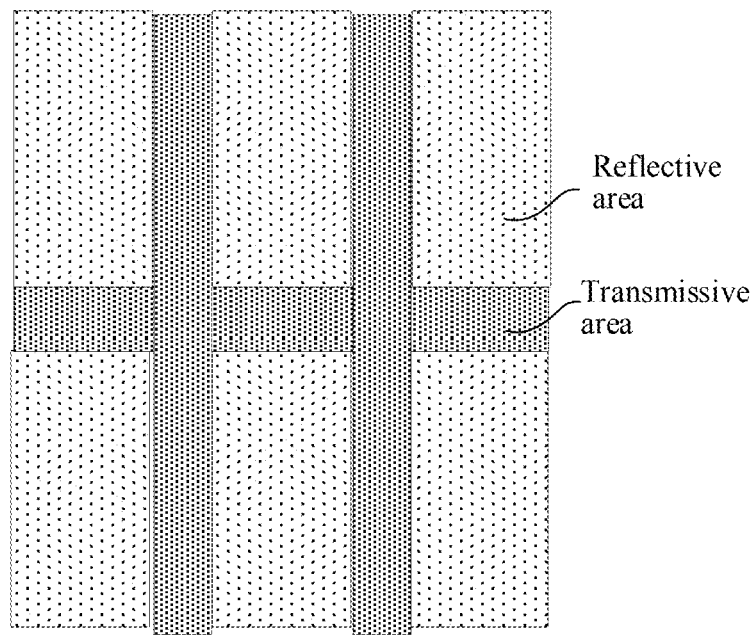
FIGS. 2A to 2C are schematic diagrams of structures of valid display areas of three different transflective display panels.
Figure 3:
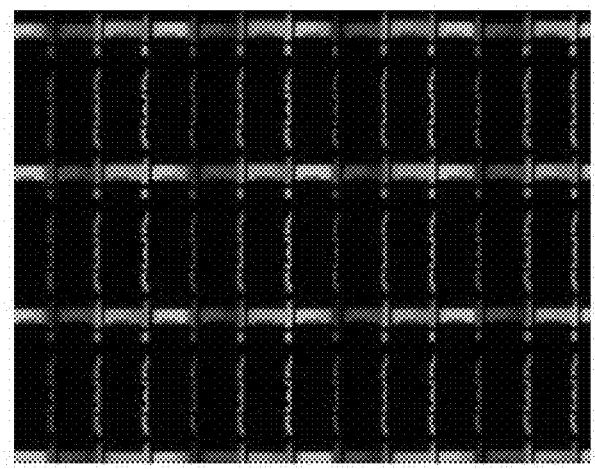
FIG. 3 is a schematic diagram of color mixing effects of transmissive pictures of some display panels.

As shown in FIG. 2A, there is no black matrix in an Active Area, and a reflective layer includes multiple reflective units arranged in an array, and the multiple reflective units form a reflective area. A space area between the reflective units serves as a transmissive area. An advantage of this structure is to ensure that a reflective opening is maximized, that is, a reflectivity is maximized. A disadvantage of it is that in a data line direction, a color resistance mixing area is not shielded. Due to existence of color resistance mixing and an oblique electric field, color mixing occurs in a transmissive picture. As shown in FIG. 3, a color mixing ratio is as high as 50%, and a color gamut in a transmissive mode is low, which is not conducive to improvement of image quality.

2) A valid display area includes a grid BM, and a reflective area and a transmissive area divide up a pixel opening area.

Figure 2B:
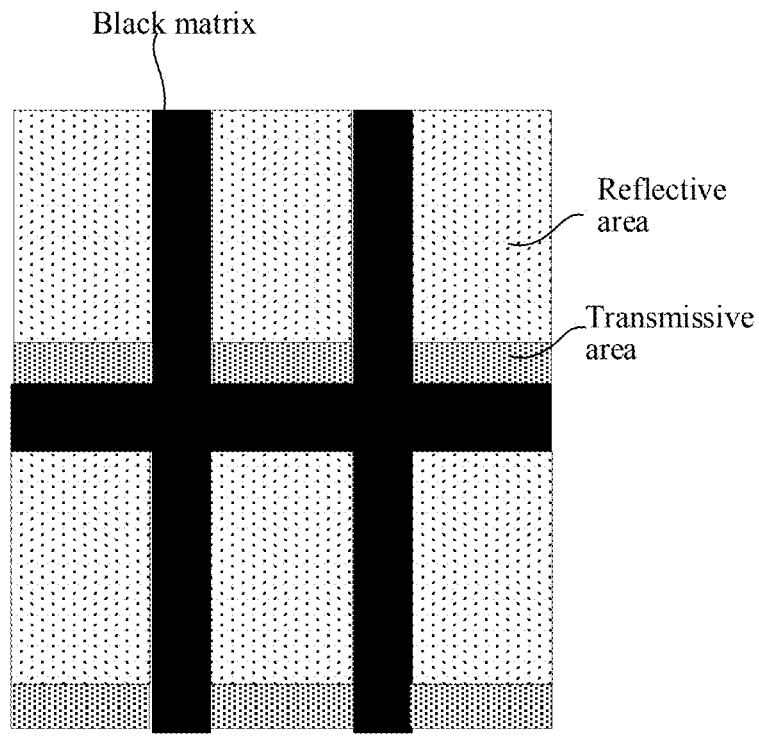

As shown in FIG. 2B, a part of the pixel opening area in the valid display area is used as the reflective area, and a remaining part of the pixel opening area is used as the transmissive area. An advantage of this structure is to ensure a higher color gamut of the reflective mode and the transmissive mode and low risk of color mixing. A disadvantage of it is that a reflective opening is small, and fluctuation of alignment in a cell forming process will affect a reflectivity and a color gamut of the transmissive mode adversely.

3) There is a BM in the valid display area in a data line direction, but there is no BM in a gate line direction, and a transverse space area is used as a transmissive area.

Figure 2C:
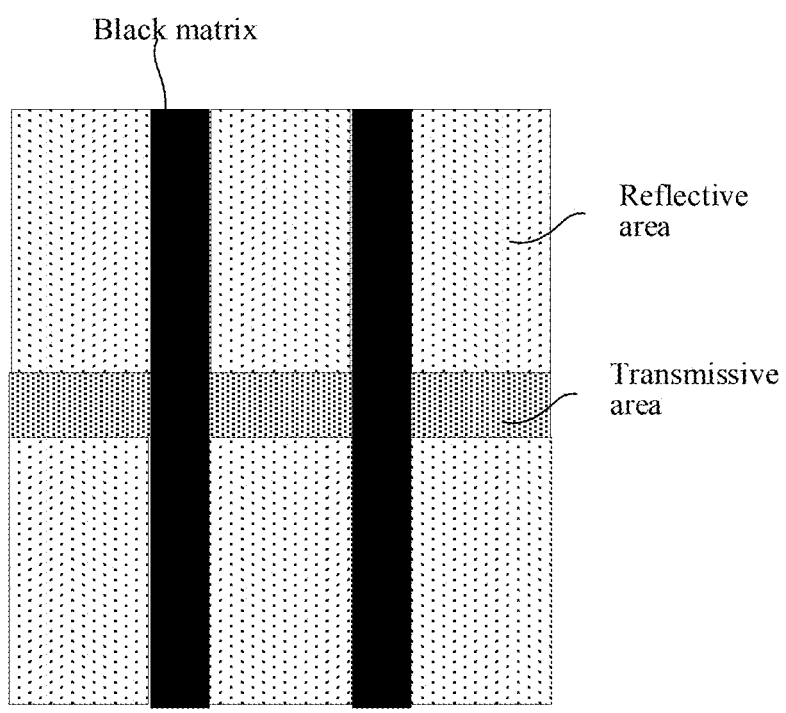

As shown in FIG. 2C, a reflective layer includes multiple reflective units arranged in an array, the multiple reflective units form a reflective area, the data line direction is shielded by the BM and the gate line direction has no BM, and a space area between adjacent reflective rows serves as the transmissive area. An advantage of this structure is color mixing in a transmissive mode is lighter and a reflective opening is larger. However, since a striped BM is prone to peeling, it is required that a width of a BM should not be too narrow, which leads to a metal pattern of the reflective layer being shielded partially, resulting in loss of reflective opening and a decreased reflectivity.

Figure 4A:
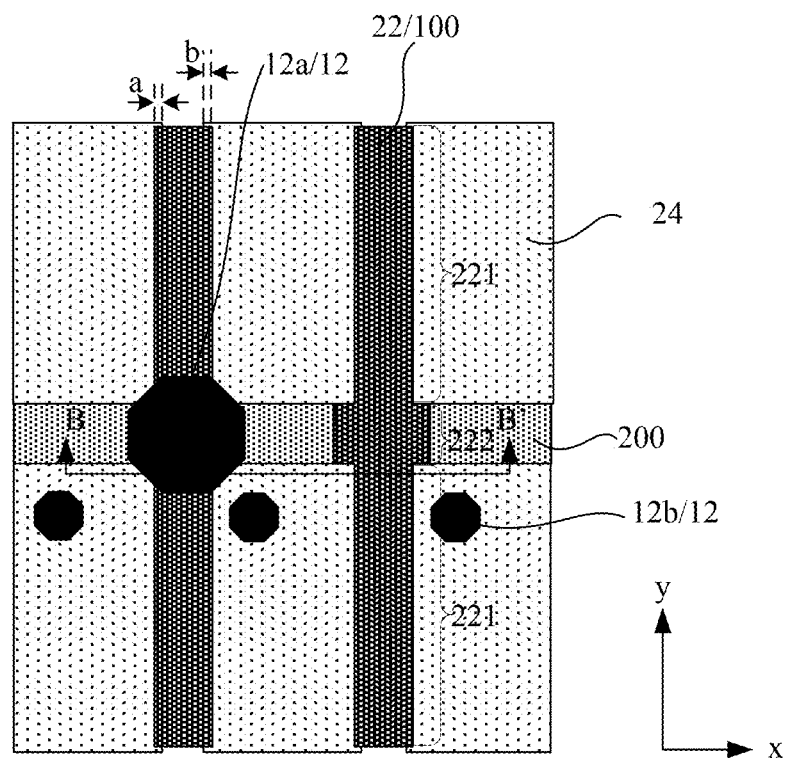
FIG. 4A is a schematic diagram of a planar structure of a display panel according to an embodiment of the present disclosure.
Figure 5A:
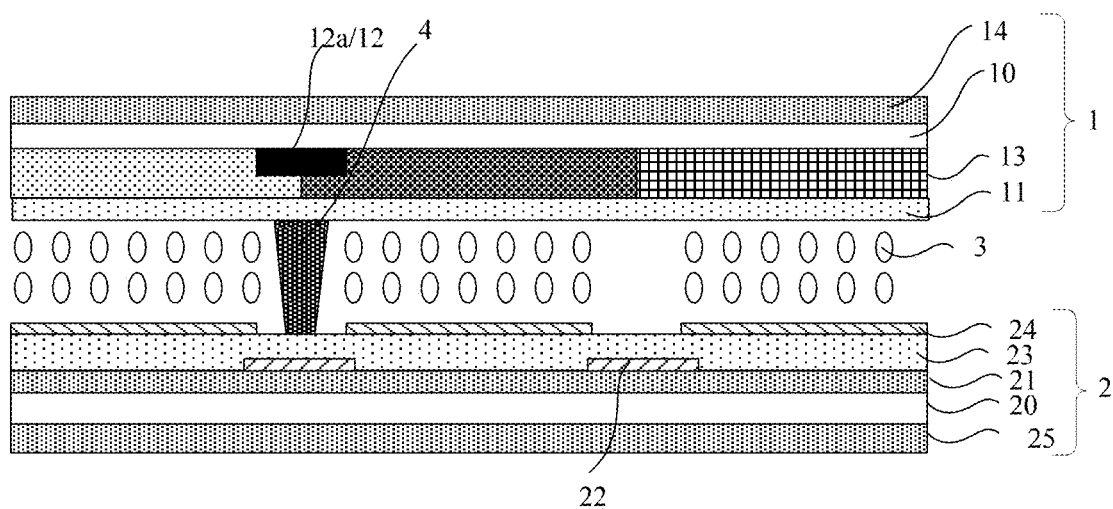
FIG. 5A is a schematic diagram of a cross-sectional structure of a BB' area of a display panel shown in FIG. 4A.

FIG. 4A is a schematic diagram of a planar structure of a display panel according to an embodiment of the present disclosure. FIG. 5A is a schematic diagram of a cross-sectional structure of a BB' area of a display panel shown in FIG. 4A. As shown in FIG. 4A and FIG. 5A, the display panel of the embodiment of the present disclosure includes a first substrate 1 and a second substrate 2 disposed oppositely, and a liquid crystal layer 3 sandwiched between the first substrate 1 and the second substrate 2.

The second substrate 2 includes an array structure layer 21, a shielding layer 22, an insulating layer 23, and a reflective layer 24 which are sequentially disposed on a second base substrate 20.

The reflective layer 24 includes multiple reflective units arranged in an array along a first direction x and a second direction y intersecting with each other, the multiple reflective units form multiple reflective rows and multiple reflective columns, and the multiple reflective rows and the multiple reflective columns form a reflective area. A space area between adjacent reflective columns forms a first space area 100, and a space area between adjacent reflective rows forms a second space area 200.

The shielding layer 22 includes multiple light shielding units arranged sequentially along the first direction x, each light shielding unit extends along the second direction y, and an orthographic projection of each light shielding unit on the second base substrate 20 covers an orthographic projection of the first space area 100 on the second base substrate 20, that is, a width of each light shielding unit in the first direction x is greater than or equal to a width of the first space area 100 in the first direction x.

Figure 6:
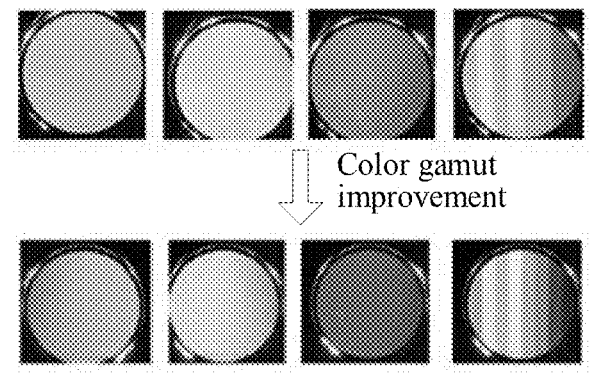
FIG. 6 is a schematic diagram of a color gamut improvement effect of a display panel according to an embodiment of the present disclosure.

According to the display panel of the embodiment of the present disclosure, multiple light shielding units are disposed, such that the whole display panel does not need to be disposed with a black matrix for avoiding color mixing of a transmissive picture, so the whole display panel may achieve a design of a maximum reflectivity without influence of process problems such as BM peeling or fluctuation of alignment. FIG. 6 is comparison diagrams of color gamut effects between display panels in some technologies and the display panel according to the embodiment of the present disclosure in a transmissive mode. As shown in FIG. 6, a color mixing ratio of the transmissive picture may be reduced to below 5%, thereby improving user experience. In addition, the display panel according to the embodiment of the present disclosure does not need to increase a quantity of masks, and the shielding layer 22 may be made in a same layer as a shielding layer used for shielding semiconductor silicon in a current display panel, which has good process compatibility, no change in existing process equipment, and has good application prospects.

In an embodiment of the present application, the second space area 200 forms a transmissive area, and the multiple reflection units form a reflection area.

In some exemplary embodiments, as shown in FIG. 4A, each light shielding unit includes a first light shielding part 221 and a second light shielding part 222, and an orthographic projection of the first light shielding part 221 on the second base substrate 20 is not overlapped with an orthographic projection of the second space area 200 on the second base substrate 20. An orthographic projection of the second light shielding part 222 on the second base substrate 20 is overlapped with the orthographic projection of the second space area 200 on the second base substrate 20, and a width of the second light shielding part 222 in the first direction x is larger than a width of the first light shielding part 221 in the first direction x.

In some exemplary embodiments, as shown in FIG. 4A, the first light shielding part 221 includes a first edge and a second edge which are disposed opposite to each other in the first direction x. The first space area 100 includes a third edge and a fourth edge which are disposed opposite to each other in the first direction x. A space a between the first edge of the first light shielding part 221 and the third edge of the corresponding first space area 100 is 1 μm to 3 μm, and a space b between the second edge of the first light shielding part 221 and the fourth edge of the corresponding first space area 100 is 1 μm to 3 μm. Exemplarily, a space a between the first edge of the first light shielding part 221 and the third edge of the corresponding first space area 100 is 2 μm, and a space b between the second edge of the first light shielding part 221 and the fourth edge of the corresponding first space area 100 is 2 μm.

In some exemplary embodiments, as shown in FIG. 4A, a width of the first space area 100 in the first direction x is 3 μm to 5 μm, and a width of the second space area 200 in the second direction y is 7 μm to 9 μm Exemplary, a width of the first space area 100 in the first direction x is 4 μm, and a width of the second space area 200 in the second direction y is 8 μm.

As shown in FIG. 4A and FIG. 5A, an embodiment of the present disclosure further provides a display panel, which includes a first substrate 1 and a second substrate 2 disposed oppositely, and a liquid crystal layer 3 sandwiched between the first substrate 1 and the second substrate 2.

The first substrate 1 includes a black matrix layer 12, a color filter layer 13, and a common electrode layer 11 sequentially disposed on a first base substrate 10. At least one of the first substrate 1 and the second substrate 2 further includes a spacer 4.

The black matrix layer 12 includes at least one first black matrix 12a, and an orthographic projection of the first black matrix 12a on the first base substrate 10 covers an orthographic projection of the spacer 4 on the first base substrate 10.

According to the display panel of the embodiment of the present disclosure, at least one first black matrix 12a is disposed, and an orthographic projection of each first black matrix 12a on the first base substrate 10 covers an orthographic projection of one spacer 4 on the first base substrate 10, such that the whole display panel does not need to be disposed with a strip-shaped black matrix for avoiding color mixing of a transmissive picture. Therefore, the whole display panel may achieve a design of a maximum reflectivity without influence of process problems such as BM peeling or fluctuation of alignment, and a color mixing ratio of the transmissive picture is greatly reduced, thereby improving user experience.

Figure 7A:
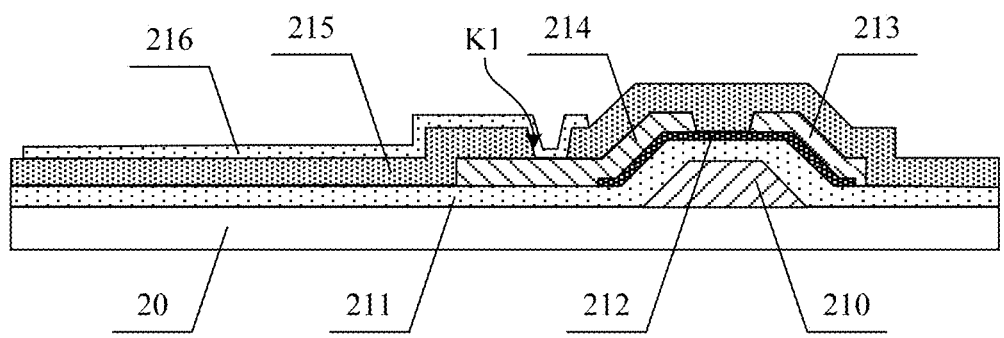
FIG. 7A is a schematic diagram of a cross-sectional structure of an array structure layer according to an embodiment of the present disclosure.

In some exemplary embodiments, the black matrix layer 12 further includes at least one second black matrix 12b. As shown in FIG. 7A, an array layer 21 includes a gate electrode 210 disposed on a second base substrate 20, a first insulating layer 211 covering the gate electrode 210, an active layer 212 disposed on the first insulating layer 211, a source electrode 213 and a drain electrode 214 disposed on the first insulating layer 211 and the active layer 212, a second insulating layer 215 covering the source electrode 213 and the drain electrode 214, and a connection electrode 216 disposed on the second insulating layer 215. The second insulating layer 215 is provided with at least one first via K1, and the connection electrode 216 is connected to the drain electrode 214 through the first via K1.

An orthographic projection of the second black matrix 12b on the first base substrate 10 covers an orthographic projection of the first via K1 on the first base substrate 10.

The transflective LCD needs double areas including a reflective area and a transmissive area. Due to characteristics of outdoor sports of wearable products, maximizing a reflectivity, mainly reflection and supplementing by transmission, has become a primary requirement. A grid BM design is used for some transflective LCDs, a transmissive area and a reflective area can only be disposed in a BM opening area, which is not conducive to maximizing a reflection opening, and a reflectivity is low, and fluctuation of alignment in a cell forming process causes further loss of an aperture ratio and a decreased reflectivity.

Figure 8:
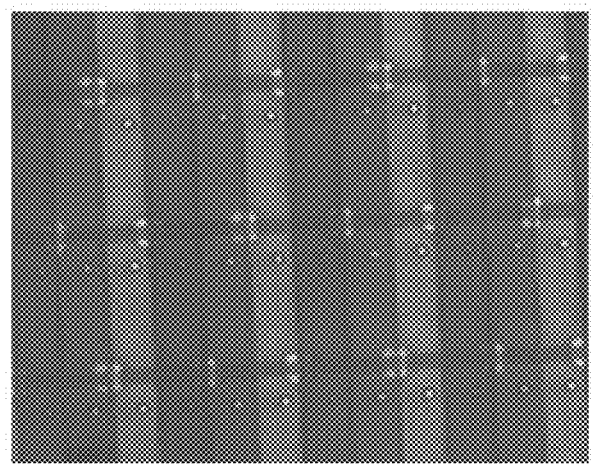
FIG. 8 is a schematic diagram of light leakage in cells of some display panels.
Figure 9:
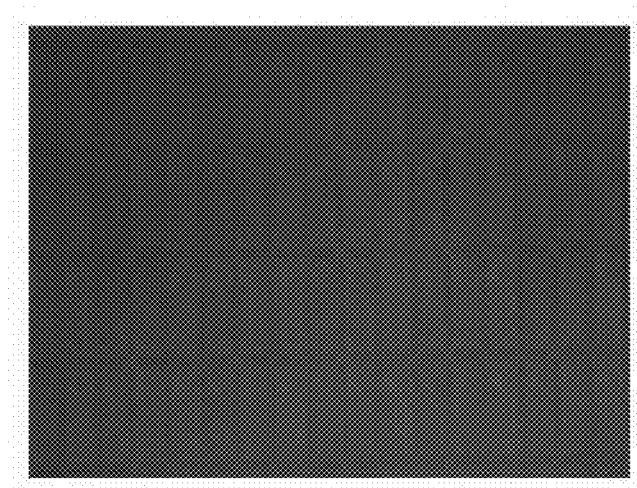
FIG. 9 is a schematic diagram of a light leakage detection result of a display panel according to an embodiment of the present disclosure.

FIG. 8 is a schematic diagram of light leakage phenomenon in a cell of a display panel. A patch "BM" designed in an embodiment of the present disclosure only shields a PS and a position of a first via, shields a light leakage position, ensures a maximum area of a reflective opening, improves a reflectivity, and a Contrast Ratio (CR) is greatly improved. FIG. 9 is an actual picture effect diagram of L0 light leakage after adding a "patch" BM according to an embodiment of the present disclosure. Compared with FIG. 8, light leakage of a display panel according to the embodiment of the present disclosure is basically invisible.

In some exemplary embodiments, as shown in FIG. 4A and FIG. 5A, a distance between an edge of an orthographic projection of a first black matrix 12a on a first base substrate 10 and an edge of an orthographic projection of a spacer 4 on the first base substrate 10 is 1 μm to 3 μm. Exemplarily, the distance between the edge of the orthographic projection of the first black matrix 12a on the first base substrate 10 and the edge of the orthographic projection of the spacer 4 on the first base substrate 10 is 2 μm.

In some exemplary embodiments, as shown in FIG. 4A and FIG. 7A, a distance between an edge of an orthographic projection of a second black matrix 12b on a base substrate 10 and an edge of an orthographic projection of a first via on the base substrate 10 is 1 μm to 3 μm. Exemplarily, the distance between the edge of the orthographic projection of the second black matrix 12b on the first base substrate 10 and the edge of the orthographic projection of the first via on the first base substrate 10 is 2 μm.

Figure 4B:
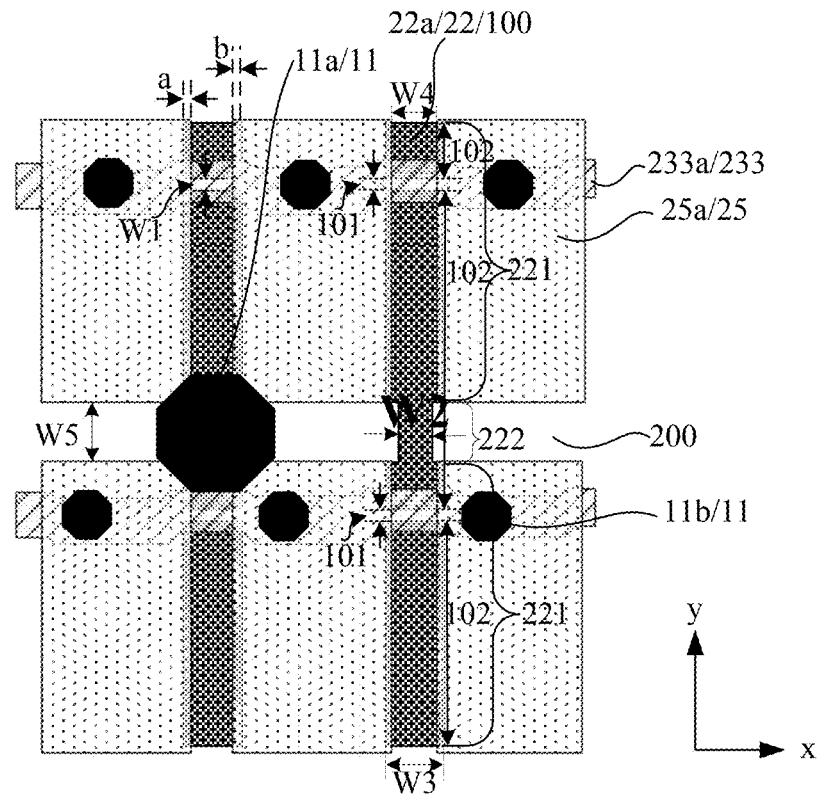
FIG. 4B is another schematic diagram of a planar structure of a display panel according to an embodiment of the present disclosure.
Figure 5B:
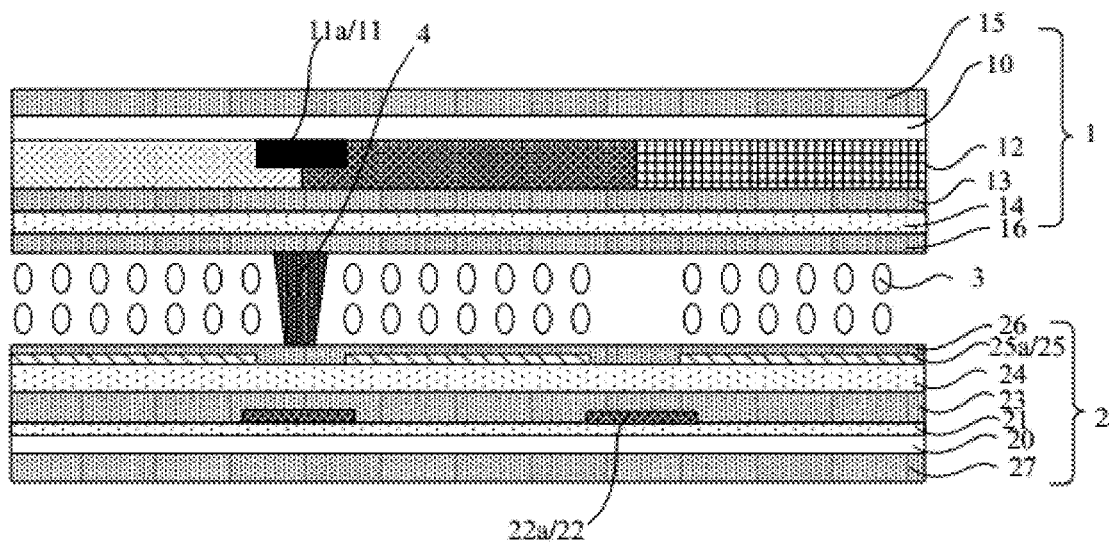
FIG. 5B is a schematic diagram of a cross-sectional structure of a display panel shown in FIG. 4B.
Figure 7B:
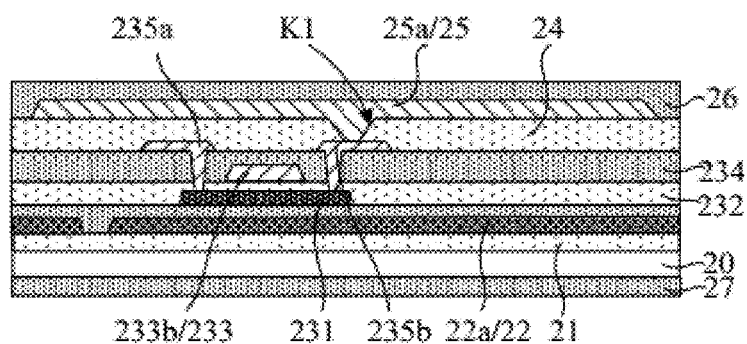
FIG. 7B is a schematic diagram of a cross-sectional structure of a second substrate in a display panel according to an embodiment of the present disclosure.

FIG. 4B is another schematic diagram of a planar structure of a display panel according to an embodiment of the present disclosure. FIG. 5B is a schematic diagram of a cross-sectional structure of a display panel shown in FIG. 4B. As shown in FIGS. 4B and 5B, an embodiment of the present disclosure further provides a display panel. The display panel includes: a first substrate 1 and a second substrate 2 disposed oppositely, and a liquid crystal layer 3 sandwiched between the first substrate 1 and the second substrate 2. FIG. 7B is a schematic diagram of a cross-sectional structure of the second substrate 2 in the display panel according to an embodiment of the present disclosure.

As shown FIGS. 4B, 5B and 7B, the second substrate 2 includes a second base substrate 20 and a buffer layer 21, a shielding layer 22, an array structure layer 23, an insulating layer 24 and a reflective layer 25 which are sequentially disposed on the second base substrate 20, wherein the array structure layer 23 includes a gate electrode layer 233, and the gate electrode layer 233 includes a plurality of gate lines 233a.

The shielding layer 22 includes a plurality of groups of light shielding units sequentially arranged along a first direction x, each group of the light shielding units includes a plurality of independent sub-light shielding units 22a sequentially arranged along a second direction y, and the first direction x intersects with the second direction y; the reflective layer 25 includes a plurality of reflective units 25a arranged in an array along the first direction x and the second direction y, the plurality of reflective units 25a form a plurality of reflective rows and a plurality of reflective columns, a space area between adjacent reflective columns forms a first space area 100, and a space area between adjacent reflective rows forms a second space area 200.

The first space area 100 includes a first sub-region 101 and a second sub-region 102, an orthographic projection of the first sub-region 101 on the second base substrate 20 is overlapped with an orthographic projection of a spacing area between two adjacent sub-light shielding units 22a in each group on the second base substrate 20, and an orthographic projection of the second sub-region 102 on the second base substrate 20 is not overlapped with an orthographic projection of a space area between two adjacent sub-light shielding unit 22a in each group on the second base substrate 20.

According to the display panel of the embodiment of the present disclosure, multiple light shielding units are disposed, such that the whole display panel does not need to be disposed with a black matrix for avoiding color mixing of a transmissive picture, so the whole display panel may achieve a design of a maximum reflectivity without influence of process problems such as BM peeling or fluctuation of alignment. In addition, by providing a plurality of independent sub-light shielding units 22a arranged sequentially in the second direction y, the extension length of the light shielding units in the second direction y is prevented from being too long, thereby effectively preventing Electrostatic Breakdown (ESD). FIG. 6 is comparison diagrams of color gamut effects between display panels in some technologies and the display panel according to the embodiment of the present disclosure in a transmissive mode. As shown in FIG. 6, a color mixing ratio of the transmissive picture may be reduced to below 5%, thereby improving user experience. In addition, the display panel according to the embodiment of the present disclosure does not need to increase a quantity of masks, and the shielding layer 22 may be made in a same layer as a shielding layer used for shielding semiconductor silicon in a current display panel, which has good process compatibility, no change in existing process equipment, and has good application prospects.

In some exemplary embodiments, an orthographic projection of at least one gate line 233a on the second base substrate 20 covers an orthographic projection of the first sub-region 101 on the second base substrate 20, and an orthographic projection of the light shielding unit on the second base substrate 20 covers an orthographic projection of the second sub-region 102 on the second base substrate 20.

In an embodiment of the present application, the second space area 200 forms a transmissive area, and the multiple reflective units 25a form a reflection area.

In some exemplary embodiments, as shown in FIG. 4B each sub-light shielding unit 22a is an elongated structure extending along the second direction y.

In some exemplary embodiments, as shown in FIG. 4B, the width W1 of the first sub-region 101 in the second direction y is 2 μm to 4 μm. Exemplarily the width W1 of the first sub-region 101 in the second direction Y may be 3 μm.

In some exemplary embodiments, as shown in FIG. 4B, each of the light shielding units includes a first light shielding part 221 and a second light shielding part 222, an orthographic projection of the first light shielding part 221 on the second base substrate 20 is not overlapped with an orthographic projection of the second space area 200 on the second base substrate 20; an orthographic projection of the second light shielding part 222 on the second base substrate 20 is overlapped with the orthographic projection of the second space area 200 on the second base substrate 20, and a width W2 of the second light-shielding portion 222 in the first direction x is smaller than a width W3 of the first light-shielding portion 221 in the first direction x.

In some exemplary embodiments, as shown in FIG. 4B, the width W3 of the first light shielding part 221 in the first direction x is greater than or equal to the width W4 of the first space area 100 in the first direction x.

In some exemplary embodiments, as shown in FIG. 4B, the width W3 of the first light shielding part 221 in the first direction x is between 5 and 8 μm. Exemplarily the width W3 of the first light shielding part 221 in the first direction X may be 6.4 μm.

In some exemplary embodiments, as shown in FIG. 4B, the first light shielding part 221 includes a first edge and a second edge which are disposed oppositely to each other in the first direction x, and the first space area 100 includes a third edge and a fourth edge which are disposed opposite to each other in the first direction. The first edge of the first light shielding part 221 is located on a side of the third edge of the corresponding first space area away from the fourth edge, and the second edge of the first light shielding part 221 is located on a side of the fourth edge of the corresponding first space area away from the second edge. A space between the first edge of the first light shielding part 221 and the third edge of the corresponding first space area is 0.8 μm to 1.5 μm, and a space between the second edge of the first light shielding part 221 and the fourth edge of the corresponding first space area is 0.8 μm to 1.5 μm.

Exemplarily, a space a between the first edge of the first light shielding part 221 and the third edge of the corresponding first space area 100 is 1.2 μm, and a space b between the second edge of the first light shielding part 221 and the fourth edge of the corresponding first space area 100 is 1.2 μm.

A display panel of an embodiment of the present disclosure, by making the width W3 of the first light shielding part 221 in the first direction X greater than or equal to the width W4 of the first space area 100 in the first direction X, the orthographic projection of the first light shielding part 221 on the second base substrate 20 can cover the orthographic projection of the two opposite edges of the corresponding first space area in the first direction X on the second base substrate 20, thereby ensuring the shielding effect of the shielding layer and avoiding color mixing of the transmitted picture.

In some exemplary embodiments, as shown in FIG. 4B, the width W2 of the second light shielding part 222 in the first direction x is smaller than the width W4 of the first space area 100 in the first direction x.

In some exemplary embodiments, as shown in FIG. 4B, the width W2 of the second light shielding part 222 in the first direction x is between 3 μm and 5 μm. Exemplarily the width W2 of the second light shielding part 222 in the first direction X may be 4.0 μm.

In the display panel of the embodiment of the present disclosure, by making the width W2 of the second light shielding part 222 in the first direction X smaller than the width W3 of the first light shielding part 221 in the first direction X, on the one hand, the shielding effect of the shielding layer can be ensured, and color mixing of the transmitted picture can be avoided; on the other hand, it can increase the transmission aperture ratio and light transmittance.

In some exemplary embodiments, as shown in FIG. 4B, the width W4 of the first space area 100 in the first direction x may be between 3 μm and 5 and the width W5 of the second space area 200 in the second direction y may be between 7 μm and 9 μm.

Exemplary, the width W4 of the first space area 100 in the first direction x may be 4 and the width W5 of the second space area 200 in the second direction y may be 8 μm.

In some exemplary embodiments, as shown in FIG. 7B, the array structure layer further includes an active semiconductor layer 231 and a source-drain electrode layer, the source-drain electrode layer includes a source electrode 235a and a drain electrode 235b, the insulating layer 24 is provided with a first via K1, and the reflective unit 25a is connected to the drain electrode 235b through the first via K1.

The first substrate 1 includes a first base substrate 10 and a black matrix layer 11 and a color filter layer 12 which are sequentially disposed on the first base substrate 10; and at least one of the first substrate 1 and the second substrate 2 further includes a spacer 4.

The black matrix layer 11 includes at least one first black matrix 11a and at least one second black matrix 11b, an orthographic projection of the at least one first black matrix 11a on the first base substrate 10 covers an orthographic projection of the spacer 4 on the first base substrate 10; an orthographic projection of the at least one second black matrix 11b on the first base substrate 10 covers an orthographic projection of the first via K1 on the first base substrate.

The display panel of the embodiment of the present disclosure is provided with at least one first black matrix 11a and at least one second black matrix 11b, an orthographic projection of the first black matrix 11a on the first base substrate 10 covers an orthographic projection of the spacer 4 on the first base substrate 10; an orthographic projection of the second black matrix 11b on the first base substrate 10 covers an orthographic projection of the first via K1 on the first base substrate. The whole display panel does not need to be disposed with a strip-shaped black matrix for avoiding color mixing of a transmissive picture. Therefore, the whole display panel may achieve a design of a maximum reflectivity without influence of process problems such as BM peeling or fluctuation of alignment, and a color mixing ratio of the transmissive picture is greatly reduced, thereby improving user experience.

The transflective LCD needs double areas including a reflective area and a transmissive area. Due to characteristics of outdoor sports of wearable products, maximizing a reflectivity, mainly reflection and supplementing by transmission, has become a primary requirement. A grid BM design is used for some transflective LCDs, a transmissive area and a reflective area can only be disposed in a BM opening area, which is not conducive to maximizing a reflection opening, and a reflectivity is low, and fluctuation of alignment in a cell forming process causes further loss of an aperture ratio and a decreased reflectivity.

FIG. 8 is a schematic diagram of light leakage phenomenon in a cell of a display panel. A patch "BM" designed in an embodiment of the present disclosure only shields a spacer 4 and a position of a first via K1, which shields a light leakage position, ensures a maximum area of a reflective opening, improves a reflectivity, and greatly improves a Contrast Ratio (CR). FIG. 9 is an actual picture effect diagram of L0 state light leakage after adding a "patch" black matrix according to an embodiment of the present disclosure. Compared with FIG. 8, light leakage of a display panel according to the embodiment of the present disclosure is basically invisible.

In some exemplary embodiments, as shown in FIGS. 4B and 5B, a distance between an edge of an orthographic projection of a first black matrix 11a on a first base substrate 10 and an edge of an orthographic projection of a corresponding spacer 4 on the first base substrate 10 is between 1 μm and 3 μm. Exemplarily, the distance between the edge of the orthographic projection of the first black matrix 11a on the first base substrate 10 and the edge of the orthographic projection of the corresponding spacer 4 on the first base substrate 10 may be 2 μm.

In some exemplary embodiments, as shown in FIGS. 4B and 7B, a distance between an edge of an orthographic projection of a second black matrix 11b on the first base substrate 10 and an edge of an orthographic projection of a corresponding first via K1 on the base substrate 10 may be between 1 μm and 3 μm. Exemplarily, the distance between the edge of the orthographic projection of the second black matrix 11b on the first base substrate 10 and the edge of the orthographic projection of the corresponding first via K1 on the first base substrate 10 may be 2 μm.

Figure 10:
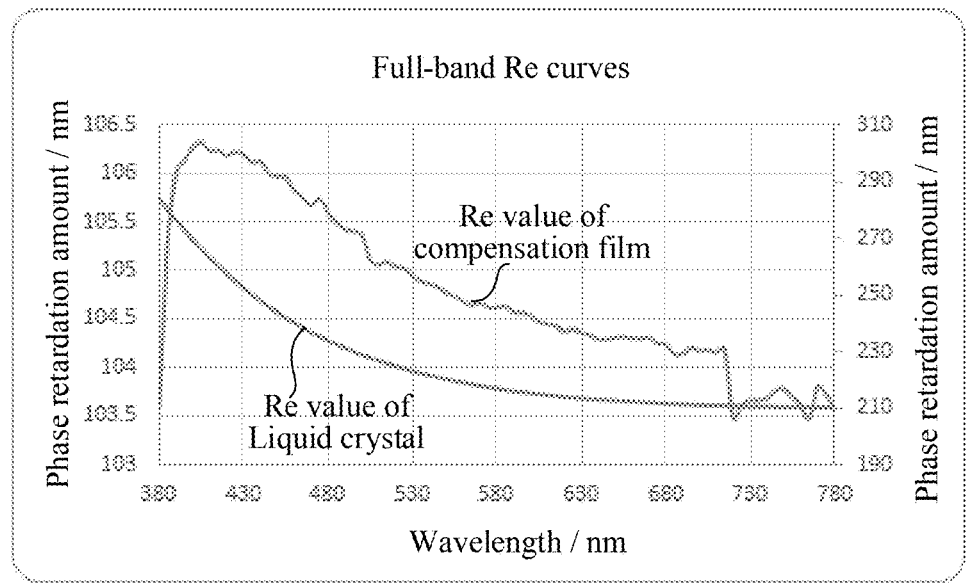
FIG. 10 is a schematic diagram of full-band phase retardation amount curves of some optical phase retardation materials.

As shown in FIG. 10, optical phase retardation materials used at present include compensation films and liquid crystals, both of which have a positive dispersion trend, that is, the longer the wavelength is, the lower the reflectivity is. In an optical path design of a reflective device, a L0 (gray tone is 0) design is usually based on a wavelength of 550 nm. Due to a high phase retardation amount (value of Re) in a low band, blue light in a L0 state cannot be absorbed by a polarizer, and leakage causes dark state reflection color shift, which greatly affects user experience adversely.

In an optical path design of the reflective mode, achievement of a L0 dark state requires that light becomes circularly polarized light before reaching a reflective layer through a liquid crystal layer. This process is represented by Poincare sphere to reach a pole point position on a spherical surface. Since wavelengths of RGB in visible light are different, a polarization state will be different after same phase retardation. A spherical surface of Poincare may be expressed by differences in distances passing the spherical surface. Change in polarization state of visible light of different wavelengths after passing through a phase difference compensation film with an axial azimuth angle θ and a phase difference R (λ) may be expressed on a Poincare sphere as: taking a position that forms an angle of 2θ with S1 as an axis, rotating clockwise from a starting position, a rotation angle is: $\Delta=360°\times(R(\lambda)/\lambda)$, wherein λ, is a wavelength of the light.

Figure 11:
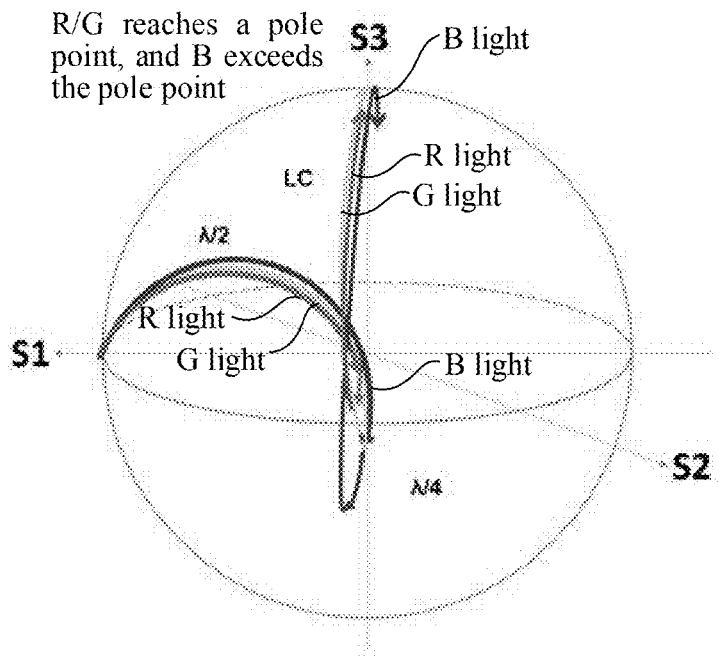
FIG. 11 is a schematic diagram of Poincare sphere models of some display panels.

As seen from the above formula, due to differences in wavelengths of multiple visible lights in RGB, a distance relationship traveled on the spherical surface is B>G>R. When an overall optical brightness of cells is the lowest, as shown in FIG. 11, G light is located at the pole point position, R light is located close to but not reaching the pole point position, and B light exceeds the pole point and travels for a long distance, which macroscopically represents that the blue light partially leaks out in a dark state, and L0 color shift occurs.

Figure 12:
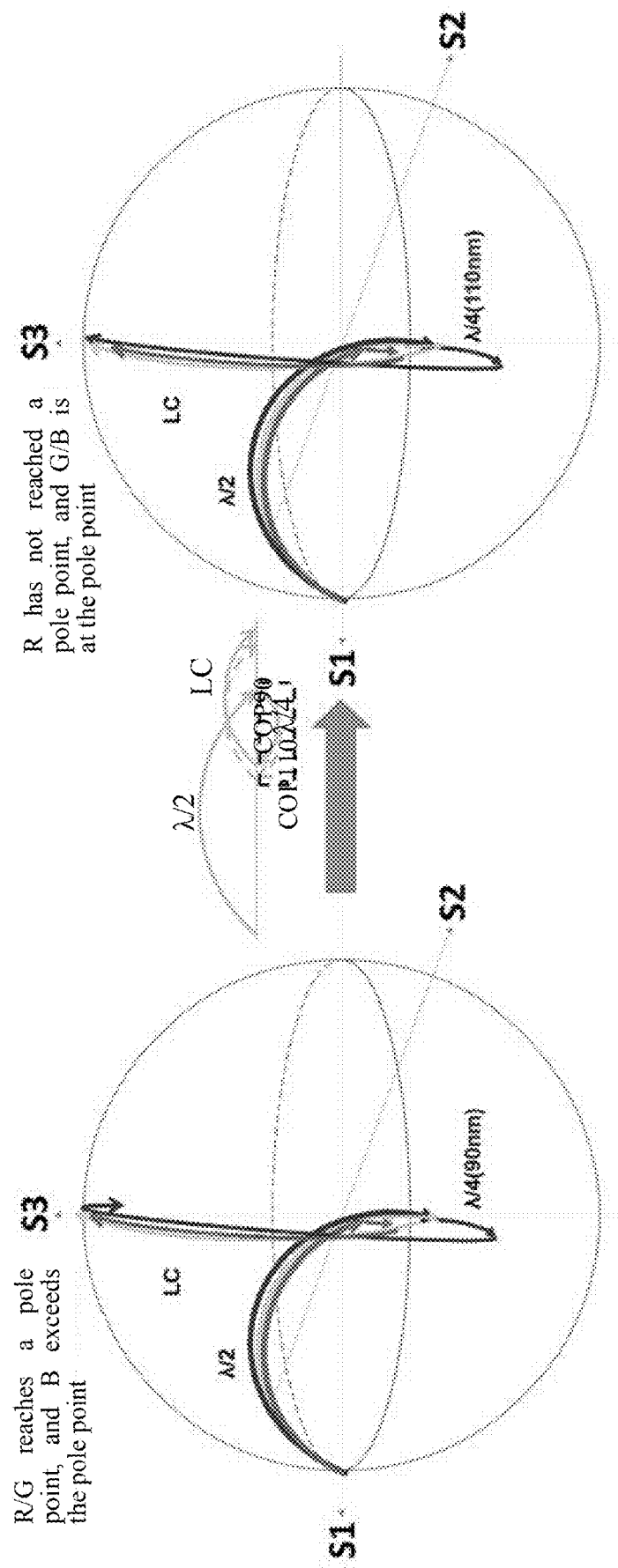
FIG. 12 is a schematic diagram of an improved principle of a Poincare sphere model of a display panel according to an embodiment of the present disclosure.

As shown in FIG. 12, according to the embodiment of the present disclosure, an optical path and a compensation value of a compensation plate are designed through a Poincare sphere model, and a ratio of RGB light output in an L0 state is adjusted. On a spherical surface of a Poincare sphere, a phase compensation value of a first quarter-wave plate 144 is adjusted from 90 nm to 110 nm, and at the same time, an overall optical path matching design is adjusted, which may be described as that a distance of blue light that travels faster on the spherical surface is increased. The blue light beyond the pole point position adjusts an angle of a compensation film, so that it travels a proper distance just to reach the pole point, while red and green light fail to reach the pole point, a leakage amount of the red and green light is more than a leakage amount of the blue light in the L0 state, and a problem of bluing and color shift in the L0 state is improved.

As shown in FIG. 4A and FIG. 5A, an embodiment of the present disclosure further provides a display panel, which includes a first substrate 1 and a second substrate 2 disposed oppositely, and a liquid crystal layer 3 sandwiched between the first substrate 1 and the second substrate 2.

Figure 13:
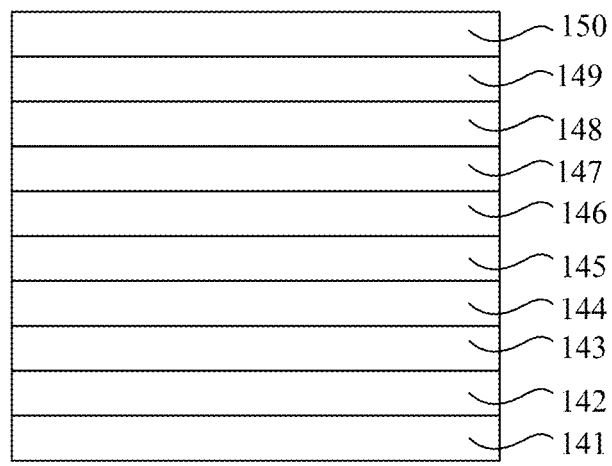
FIG. 13 is a schematic diagram of a structure of a first polarizer according to an embodiment of the present disclosure.

The first substrate 1 includes a first polarizer 14, which is disposed on a side of a first base substrate 10 away from the second substrate 2. As shown in FIG. 13, the first polarizer 14 includes a first quarter-wave plate 144, a second adhesive layer 145, a half-wave plate 146, a third adhesive layer 147, a first cellulose triacetate layer 148, a first poly vinyl alcohol layer 149, and a second cellulose triacetate layer 150 that are sequentially stacked from bottom to top. An absorption axis angle of the first poly vinyl alcohol layer 149 is n°, a slow axis angle of the half-wave plate 146 is ((n+41)%180)° to ((n+43)%180)°, and a slow axis angle of the first quarter-wave plate 144 is ((n+162)%180)° to ((n+164)%180)°, n is between 0 and 180.

In some exemplary embodiments, as shown in FIG. 13, the first polarizer 14 further includes a first Optically Clear Adhesive (OCA) layer 141, a scattering film 142, and a first adhesive layer 143, and the first Optically Clear Adhesive (OCA) layer 141, the scattering film 142, the first adhesive layer 143, the first quarter-wave plate 144, the second adhesive layer 145, the half-wave plate 146, the third adhesive layer 147, the first cellulose triacetate (TAC) layer 148, the first poly vinyl alcohol (PVA) layer 149, and the second cellulose triacetate (TAC) layer 150 are sequentially stacked from bottom to top. The scattering film 142 is added to the first polarizer 14 to expand viewing angle. The first TAC layer 148 and the second TAC layer 150 are both 0-TAC to reduce phase interference. A surface of the first polarizer 14 may be coated so that it has a function of Hard Coating (HC).

In some exemplary embodiments, an absorption axis angle of the first PVA layer 149 may be set to 20°. A slow axis angle of the half-wave plate 146 may be 42°, and a slow axis angle of the first quarter-wave plate 144 may be 163°.

In some other exemplary embodiments, an absorption axis angle of the first PVA layer 149 may be set to 40°. A slow axis angle of the half-wave plate 146 may be 62°, and a slow axis angle of the first quarter-wave plate 144 may be 183°.

In some exemplary embodiments, a phase compensation value of the half-wave plate 146 may be 265 nm to 275 nm, exemplarily, the phase compensation value of the half-wave plate 146 may be 270 nm. A phase compensation value of the first quarter-wave plate 144 may be 105 nm to 115 nm, exemplarily the phase compensation value of the first quarter-wave plate 144 may be 110 nm.

In the embodiment of the present disclosure, a double compensation design is adopted for the first polarizer 14, including the half-wave plate 146 and the first quarter-wave plate 144. The half-wave plate 146 may be made of a Cyclo Olefin Polymer (COP) material, and the first quarter-wave plate 144 may also be made of a COP material.

Figure 14:
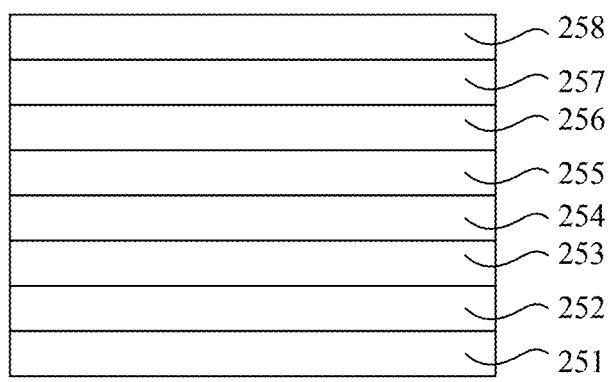
FIG. 14 is a schematic diagram of a structure of a second polarizer according to an embodiment of the present disclosure.

In some exemplary embodiments, the second substrate 2 further includes a second polarizer 25, which is disposed on a side of the second base substrate 20 away from the first substrate 1. As shown in FIG. 14, the second polarizer 25 includes a second quarter-wave plate 252, a fourth adhesive layer 253, a third cellulose acetate (TAC) layer 254, a second poly vinyl alcohol (PVA) layer 255, and a fourth cellulose acetate (TAC) layer that are sequentially stacked from bottom to top. An absorption axis angle of the second PVA layer 255 is (n+89)%180)° to (n+91)%180)°, and a slow axis angle of the second quarter-wave plate 252 is (n+134) %180)° to (n+136)%180)°.

In some exemplary embodiments, as shown in FIG. 14, the second polarizer 25 further includes a second Optically Clear Adhesive (OCA) layer 251, a fifth adhesive layer 257, and an Advanced Patterning Film (APF) layer 258. The second Optically Clear Adhesive (OCA) layer 251, the second quarter-wave plate 252, the fourth adhesive layer 253, the third cellulose triacetate (TAC) layer 254, the second poly vinyl alcohol (PVA) layer 255, the fourth cellulose triacetate (TAC) layer 256, the fifth adhesive layer 257, and the Advanced Patterning Film (APF) layer 258 are sequentially stacked from bottom to top. An APF reinforced film is used for the second polarizer 25, and the third TAC layer 254 and the fourth TAC layer 256 are all made of a non-phase retardation material (0-TAC).

In some exemplary embodiments, an absorption axis angle of the first PVA layer 149 may be set to 20°. An absorption axis angle of the second PVA layer 255 is 110°, and a slow axis angle of the second quarter-wave plate 252 is 155°.

In some other exemplary embodiments, an absorption axis angle of the first PVA layer 149 may be set to 40°. An absorption axis angle of the second PVA layer 255 is 130°, and a slow axis angle of the second quarter-wave plate 252 is 175°.

In some exemplary embodiments, a phase compensation value of the second quarter-wave plate 252 is 135 nm to 145 nm.

In an embodiment of the present disclosure, a single compensation design is adopted for the second polarizer 25, including the second quarter-wave plate 252. Exemplarily, the second quarter-wave plate 252 may also be made of a COP material, and exemplarily, a phase compensation value may be 140 nm, and a slow axis angle may be 155°.

In some exemplary embodiments, a Twist Angle (TA) of the liquid crystal layer 3 is 51° to 53°. Exemplarily, the Twist Angle (TA) of the liquid crystal layer 3 may be 52°.

In some exemplary embodiments, a phase retardation amount (value of Re) of the liquid crystal layer 3 is 213.5 nm to 214.5 nm, a rubbing angle of the first substrate 1 is −109.5° to −108.5°, and a rubbing angle of the second substrate 2 is 122.5° to 123.5°.

Exemplarily, the phase retardation amount of the liquid crystal layer 3 is 214 nm, the rubbing angle of the first substrate 1 is −109°, and the rubbing angle of the second substrate 2 is 123°.

According to the embodiment of the present disclosure, a phase retardation amount of a compensation film and a matching relationship between a slow axis angle and a rubbing angle in a cell are designed, and a problem of bluing in a dark state of a TN normally black mode is improved and an optical display effect is optimized by utilizing the Poincare sphere theory.

A whole reflective optical path of the display panel of the embodiment of the present application is designed as the TN normally black mode. External light enters through the first polarizer 14, is reflected by the first polarizer 14, the first base substrate 10, the liquid crystal layer 3, and the reflective layer 24, and then exits after passing through the liquid crystal layer 3, the first base substrate 10, and the first polarizer 14 again. A transmissive optical path is that light is emitted from a backlight module (BLU), passes through the second polarizer 25, a transmissive area of the second base substrate 20, the liquid crystal layer 3, the first base substrate 10, and the first polarizer 14 to emit.

In the embodiment of the present disclosure, a reflective optical path angle is designed as follows: an absorption axis angle of the first PVA layer 149 is set to 20°, a material of a half-wave plate is COP, a phase compensation value is 270 nm, and a slow axis angle is 42°; a material of the first quarter-wave plate 144 is COP, a phase compensation value is 110 nm, and a slow axis angle is 163°; a value of Re of the liquid crystal layer 3 is 214 nm; a rubbing angle of the first substrate 1 is set to −109°; a rubbing angle of the second substrate 2 is set to 123°; and a TA of the liquid crystal layer 3 is 52°.

A transmissive angle is designed such that an absorption axis angle of the second PVA layer 255 is 110°, a material of the second quarter-wave plate 252 is COP, a phase compensation value is 140 nm, and a slow axis angle is 155°.

Figure 15A:
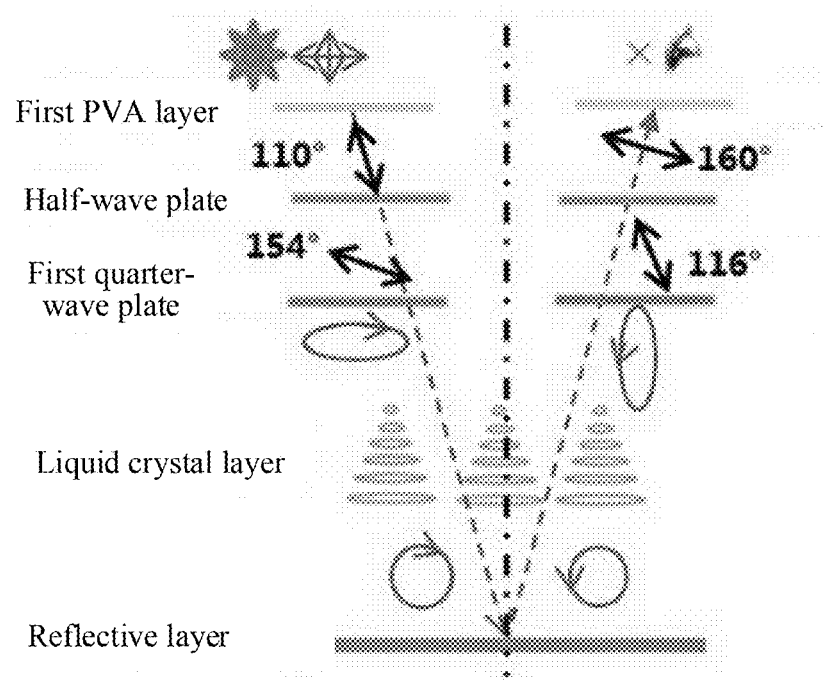
FIG. 15A is a schematic diagram showing a change in light polarization in an off-state of a reflective mode of a display panel according to an embodiment of the present disclosure.

As shown in FIG. 15A, in an off-state of a reflective mode, natural light passes through the first PVA layer 149 and becomes linear polarized light parallel to 110°, passing through the half-wave plate, emitted light is linearly polarized light of 154°, and becomes circularly polarized light before reaching the reflective layer 24 under a dual action of the first quarter-wave plate 144 and the liquid crystal layer 3. After half-wave loss of the reflective layer 24, emitted light becomes circularly polarized light with an opposite rotation direction, a long axis of elliptical polarized light in a case before the emitted light reaches the first quarter wave plate 144 after passing through the liquid crystal layer 3, is perpendicular to a long axis of elliptical polarized light in a case before incident light enters a liquid crystal layer after exiting the first quarter wave plate 144. The emitted light becomes linearly polarized light again after passing through the first quarter-wave plate 144, becomes linearly polarized light of 160° after exiting the half-wave plate, and is parallel to an absorption axis angle of the first PVA layer 149 and absorbed. At this time, it is in the off-state.

Figure 15B:
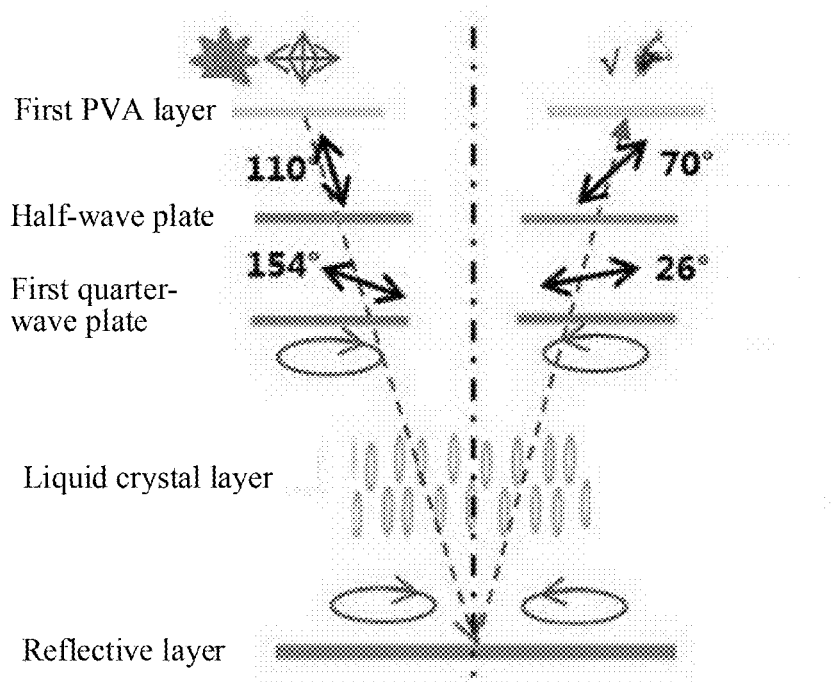
FIG. 15B is a schematic diagram showing a change in light polarization in an on-state of a reflective mode of a display panel according to an embodiment of the present disclosure.

As shown in FIG. 15B, in an on-state of the reflective mode, TN liquid crystal stands up in the on-state without refraction, and a polarization state before light reaches the reflective layer 24 is the same as a polarization state after the light exits the first quarter wave plate 144. A rotation direction is opposite after half-wave loss of the reflective layer 24 occurs, a rotation direction in a case after emitted light exits the liquid crystal layer 3, is opposite to a rotation direction in a case before incident light enters the liquid crystal layer 3, a phase difference is 180°, the emitted light becomes linearly polarized light of 70° after exiting the half-wave plate, and is perpendicular to an absorption axis angle of the first PVA layer 149 and may be transmitted. At this time, it is in the on-state.

Figure 15C:
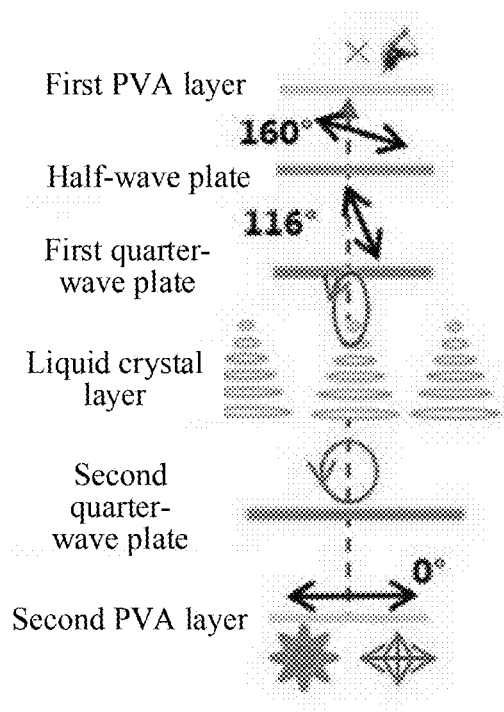
FIG. 15C is a schematic diagram showing a change in light polarization in an off-state of a transmissive mode of a display panel according to an embodiment of the present disclosure.

As shown in FIG. 15C, in an off-state of a transmissive mode, light from a backlight module (BLU) becomes linearly polarized light of 20° after passing through the second PVA layer 255, forms an angle of 45° with the second quarter-wave plate 252, and becomes circularly polarized light before entering the liquid crystal layer 3. A subsequent optical path is consistent with an exit optical path in the off-state of the reflective mode, and the off-state is finally achieved.

Figure 15D:
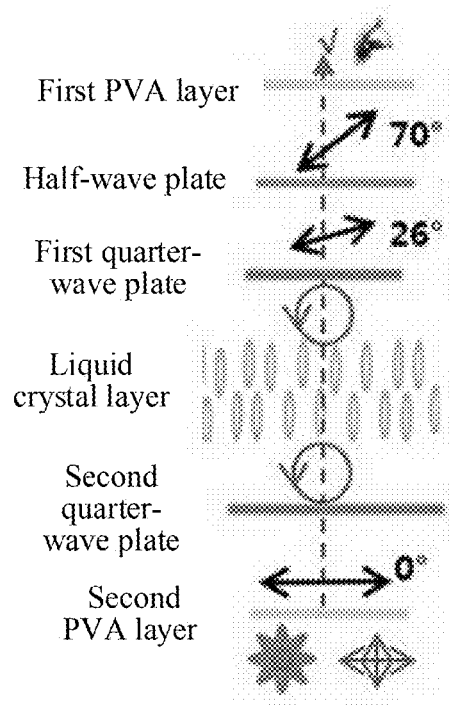
FIG. 15D is a schematic diagram showing a change in light polarization in an on-state of a transmissive mode of a display panel according to an embodiment of the present disclosure.

As shown in FIG. 15D, in an on-state of the transmissive mode, light from a BLU becomes circularly polarized light before entering the liquid crystal layer 3 through the second PVA layer 255, and may be decomposed into two parts of light which are parallel and perpendicular to the exit optical path of the reflective mode. A parallel part finally passes through the first polarizer 14, while a vertical part is absorbed, thus achieving on-state control.

As shown in FIGS. 4B and 5B, an embodiment of the present disclosure further provides a display panel. The display panel includes: a first substrate 1 and a second substrate 2 disposed oppositely, and a liquid crystal layer 3 sandwiched between the first substrate 1 and the second substrate 2.

The first substrate 1 includes a first polarizer 15 disposed on a side of the first base substrate 10 away from the second substrate 2. As shown in FIG. 13, the first polarizer 15 includes a first quarter-wave plate 154, a second adhesive layer 155, a half-wave plate 156, a third adhesive layer 157, a first cellulose triacetate layer 158, a first poly vinyl alcohol layer 159, and a second cellulose triacetate layer 160 which are sequentially arranged along a direction away from the second substrate 2, wherein an absorption axis angle of the first poly vinyl alcohol layer 159 is n°, a slow axis angle of the half-wave plate 156 is ((n+21)%180)° to ((n+23)%180)°, a slow axis angle of the first quarter-wave plate 154 is ((n+142)%180)° to ((n+144)%180)°, and n is between 0 and 180.

Figure 16:
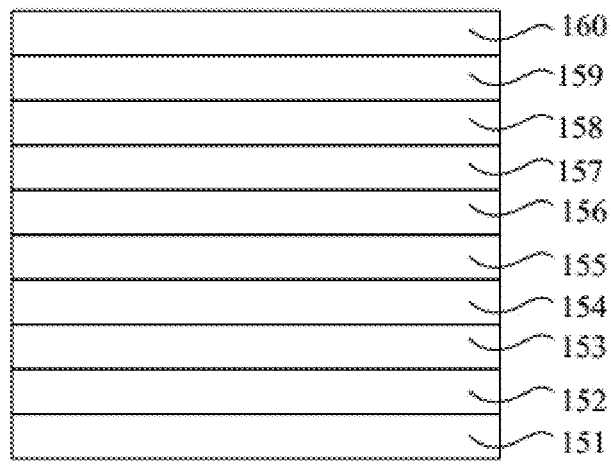
FIG. 16 is a schematic diagram of a structure of a first polarizer in a display panel according to an embodiment of the present disclosure.

In some exemplary embodiments, as shown in FIG. 16, the first polarizer 15 further includes a first Optically Clear Adhesive (OCA) layer 151, a scattering film 152, and a first adhesive layer 153, and the first Optically Clear Adhesive (OCA) layer 151, the scattering film 152, the first adhesive layer 153, the first quarter-wave plate 154, the second adhesive layer 155, the half-wave plate 156, the third adhesive layer 157, the first cellulose triacetate (TAC) layer 158, the first poly vinyl alcohol (PVA) layer 159, and the second cellulose triacetate (TAC) layer 160 are arranged sequentially along the direction away from the second substrate 2. The scattering film 152 is added to the first polarizer 15 to expand viewing angle. The first TAC layer 158 and the second TAC layer 160 are both 0-TAC to reduce phase interference. A surface of the first polarizer 15 may be coated so that it has a function of Hard Coating (HC).

In some exemplary embodiments, an absorption axis angle of the first PVA layer 159 may be set to 20°. A slow axis angle of the half-wave plate 156 may be 42°, and a slow axis angle of the first quarter-wave plate 154 may be 163°.

In some other exemplary embodiments, an absorption axis angle of the first PVA layer 159 may be set to 35°. A slow axis angle of the half-wave plate 156 may be 57°, and a slow axis angle of the first quarter-wave plate 154 may be 163°.

In some exemplary embodiments, a phase compensation value of the half-wave plate 156 may be between 265 nm and 275 nm, exemplarily, the phase compensation value of the half-wave plate 156 may be 270 nm. A phase compensation value of the first quarter-wave plate 154 may be between 105 nm and 115 nm, exemplarily the phase compensation value of the first quarter-wave plate 154 may be 110 nm.

In the embodiment of the present disclosure, a double compensation design is adopted for the first polarizer 15, including the half-wave plate 156 and the first quarter-wave plate 154. The half-wave plate 156 may be made of a Cyclo Olefin Polymer (COP) material, and the first quarter-wave plate 154 may also be made of a COP material.

Figure 17:
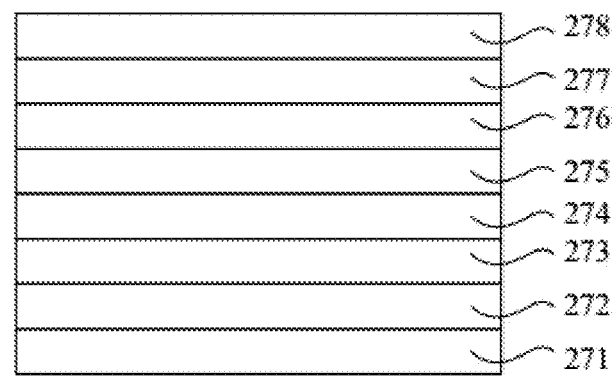
FIG. 17 is a schematic diagram of a structure of a second polarizer in a display panel according to an embodiment of the present disclosure.

In some exemplary embodiments, as shown in FIG. 5B and FIG. 17, the second substrate 2 further includes a second polarizer 27 disposed on a side of the second base substrate 20 away from the first substrate 1, and the second polarizer includes a second quarter-wave plate 272, a fourth adhesive layer 273, a third cellulose triacetate layer 274, a second poly vinyl alcohol layer 275, and a fourth cellulose triacetate layer 276 which are sequentially arranged along a direction away from the first substrate 1, wherein an absorption axis angle of the second poly vinyl alcohol layer 275 is ((n+89)%180)° to ((n+91)%180)°, and a slow axis angle of the second quarter-wave plate 272 is ((n+139)%180)° to ((n+141)%180)°.

In some exemplary embodiments, as shown in FIG. 17, the second polarizer 27 further includes a second Optically Clear Adhesive (OCA) layer 271, a fifth adhesive layer 277, and an Advanced Patterning Film (APF) layer 278. The second Optically Clear Adhesive (OCA) layer 271, the second quarter-wave plate 272, the fourth adhesive layer 273, the third cellulose triacetate (TAC) layer 274, the second poly vinyl alcohol (PVA) layer 275, the fourth cellulose triacetate (TAC) layer 276, the fifth adhesive layer 277, and the Advanced Patterning Film (APF) layer 278 are sequentially arranged along a direction away from the first substrate 1. An APF reinforced film is used for the second polarizer 27, and the third TAC layer 274 and the fourth TAC layer 276 are all made of a non-phase retardation material (0-TAC).

In some exemplary embodiments, an absorption axis angle of the first PVA layer 159 may be set to 20°. An absorption axis angle of the second PVA layer 275 is 110°, and a slow axis angle of the second quarter-wave plate 272 is 160°.

In some other exemplary embodiments, an absorption axis angle of the first PVA layer 159 may be set to 35°. An absorption axis angle of the second PVA layer 275 is 125°, and a slow axis angle of the second quarter-wave plate 272 is 175°.

In some exemplary embodiments, a phase compensation value of the second quarter-wave plate 272 is 135 nm to 145 nm.

In an embodiment of the present disclosure, a single compensation design is adopted for the second polarizer 27, including the second quarter-wave plate 272. Exemplarily, the second quarter-wave plate 272 may also be made of a COP material, and exemplarily, a phase compensation value may be 140 nm, and a slow axis angle may be 175°.

In some exemplary embodiments, a Twist Angle (TA) of the liquid crystal layer 3 is 51° to 53°. Exemplarily, the Twist Angle (TA) of the liquid crystal layer 3 may be 52°.

In some exemplary embodiments, a phase retardation amount (value of Re) of the liquid crystal layer 3 is 213.5 nm to 214.5 nm, a rubbing angle of the first substrate 1 is −94.5° to −93.5°, and a rubbing angle of the second substrate 2 is 137.5° to 138.5°.

Exemplarily, the phase retardation amount of the liquid crystal layer 3 is 214 nm, the rubbing angle of the first substrate 1 is −94°, and the rubbing angle of the second substrate 2 is 138°.

According to the embodiment of the present disclosure, a phase retardation amount of a compensation film and a matching relationship between a slow axis angle and a rubbing angle in a cell are designed, and a problem of bluing in a dark state of a TN normally black mode is improved and an optical display effect is optimized by utilizing the Poincare sphere theory.

A whole reflective optical path of the display panel of the embodiment of the present application is designed as the TN normally black mode. External light enters through the first polarizer 15, is reflected by the first polarizer 15, the first base substrate 10, the liquid crystal layer 3, and the reflective layer 25, and then exits after passing through the liquid crystal layer 3, the first base substrate 10, and the first polarizer 15 again. A transmissive optical path is that light is emitted from a backlight module (BLU), passes through the second polarizer 27, a transmissive area of the second base substrate 20, the liquid crystal layer 3, the first base substrate 10, and the first polarizer 15 to emit.

In some exemplary embodiments, a reflective optical path angle is designed as follows: an absorption axis angle of the first PVA layer 159 is set to 35°, a material of a half-wave plate is COP, a phase compensation value is 270 nm, and a slow axis angle is 57°; a material of the first quarter-wave plate 154 is COP, a phase compensation value is 110 nm, and a slow axis angle is 178°; a value of Re of the liquid crystal layer 3 is 214 nm; a rubbing angle of the first substrate 1 (also named as CF substrate) is set to −94°; a rubbing angle of the second substrate 2 (also named as TFT substrate) is set to 138'; and a TA of the liquid crystal layer 3 is 52°.

A transmissive angle is designed such that an absorption axis angle of the second PVA layer 275 is 125°, a material of the second quarter-wave plate 272 is COP, a phase compensation value is 140 nm, and a slow axis angle is 175°.

Figure 18A:
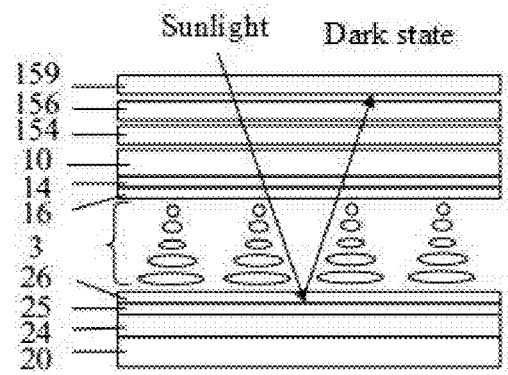
FIGS. 18A to 18B are schematic diagrams showing changes in light polarization in an off-state of a reflective mode of a display panel according to an embodiment of the present disclosure.
Figure 18B:
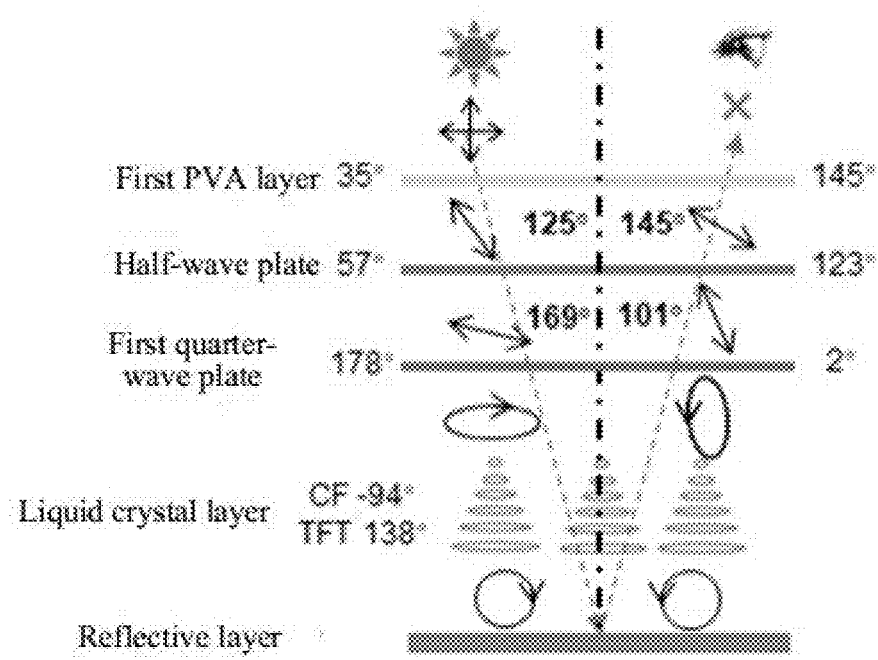

As shown in FIGS. 18A to 18B, in an off-state of a reflective mode, natural light passes through the first PVA layer 159 and becomes linear polarized light parallel to 101°, passing through the half-wave plate 156, emitted light is linearly polarized light of 169°, and becomes circularly polarized light before reaching the reflective layer 25 under a dual action of the first quarter-wave plate 154 and the liquid crystal layer 3. After half-wave loss of the reflective layer 25, emitted light becomes circularly polarized light with an opposite rotation direction, a long axis of elliptical polarized light in a case before the emitted light reaches the first quarter wave plate 154 after passing through the liquid crystal layer 3, is perpendicular to a long axis of elliptical polarized light in a case before incident light enters a liquid crystal layer after exiting the first quarter wave plate 154. The emitted light becomes linearly polarized light again after passing through the first quarter-wave plate 154, becomes linearly polarized light of 145° after exiting the half-wave plate 156, and is parallel to an absorption axis angle of the first PVA layer 159 and absorbed. At this time, it is in the off-state.

Figure 18C:
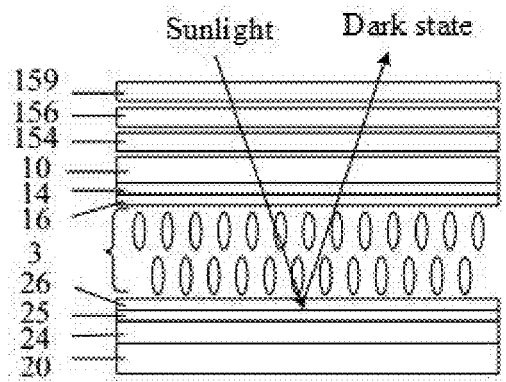
FIGS. 18C to 18D are schematic diagrams showing changes in light polarization in an on-state of a reflective mode of a display panel according to an embodiment of the present disclosure.
Figure 18D:
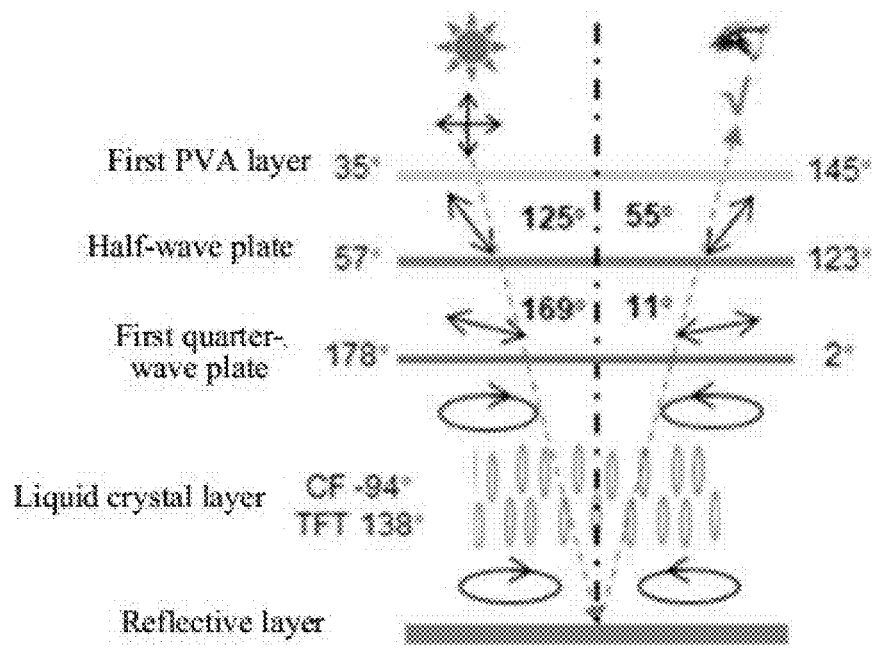

As shown in FIGS. 18C to 18D, in an on-state of the reflective mode, TN liquid crystal stands up in the on-state without refraction, and a polarization state before light reaches the reflective layer 25 is the same as a polarization state after the light exits the first quarter-wave plat 154. A rotation direction is opposite after half-wave loss of the reflective layer 25 occurs, a rotation direction in a case after emitted light exits the liquid crystal layer 3, is opposite to a rotation direction in a case before incident light enters the liquid crystal layer 3, a phase difference is 180°, the emitted light becomes linearly polarized light of 55° after exiting the half-wave plate 156, and is perpendicular to an absorption axis angle of the first PVA layer 159 and may be transmitted. At this time, it is in the on-state.

Figure 18E:
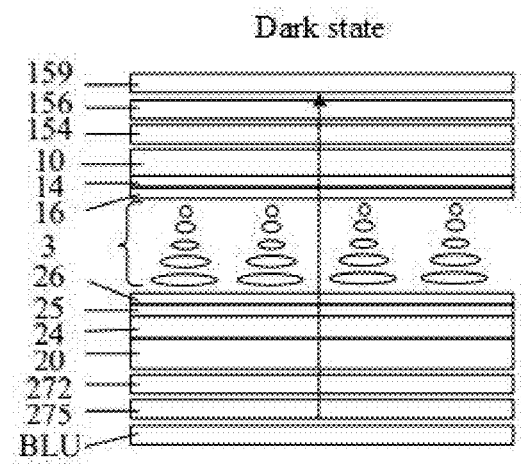
FIGS. 18E to 18F are schematic diagrams showing changes in light polarization in an off-state of a transmissive mode of a display panel according to an embodiment of the present disclosure.
Figure 18F:
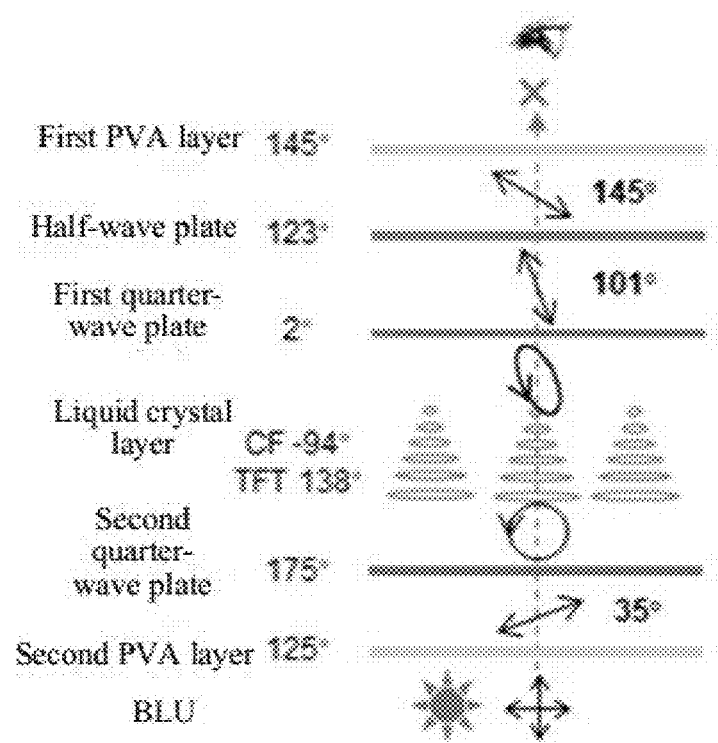

As shown in FIGS. 18E to 18F, in an off-state of a transmissive mode, light from a backlight module (BLU) becomes linearly polarized light of 35° after passing through the second PVA layer 275, forms an angle of 40° with the second quarter-wave plate 272, and becomes circularly polarized light before entering the liquid crystal layer 3. A subsequent optical path is consistent with an exit optical path in the off-state of the reflective mode, and the off-state is finally achieved.

Figure 18G:
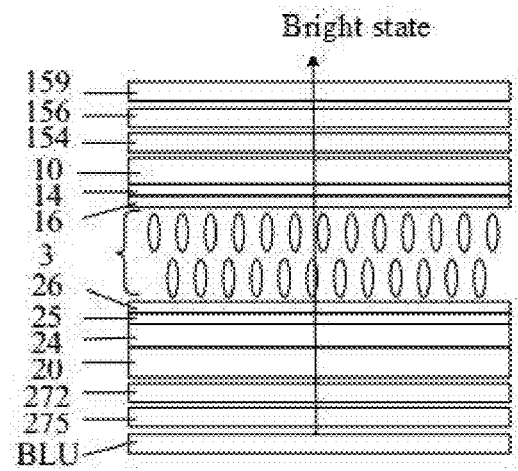
FIGS. 18G to 18H are schematic diagrams showing changes in light polarization in an on-state of a transmissive mode of a display panel according to an embodiment of the present disclosure.
Figure 18H:
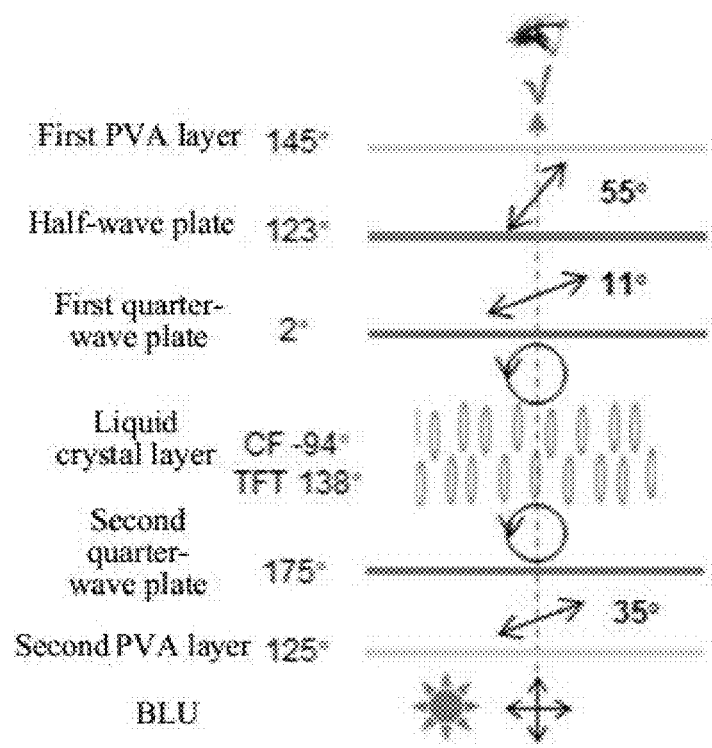

As shown in FIGS. 18G to 18H, in an on-state of the transmissive mode, light from a BLU becomes circularly polarized light before entering the liquid crystal layer 3 through the second PVA layer 275, and may be decomposed into two parts of light which are parallel and perpendicular to the exit optical path of the reflective mode. A parallel part finally passes through the first polarizer 15, while a vertical part is absorbed, thus achieving on-state control.

The technical solution of the embodiment is further described below through a preparation process of the array substrate according to the embodiment. A "patterning process" mentioned in the embodiment includes deposition of film layers, coating of photoresist, mask exposure, development, etching, stripping of photoresist, etc., and is a mature preparation process. Deposition may be performed by using a known process such as sputtering, evaporation, and chemical vapor deposition, coating may be performed by using a known coating process, and etching may be performed by using a known approach, which is not limited here. In the description of this embodiment, it should be understood that "thin film" refers to a layer of thin film manufactured through a material on a base substrate by using a deposition or coating process. If a patterning process or a photolithography process is not needed for the "thin film" during a whole manufacturing process, the "thin film" may also be referred to as a "layer". If a patterning process or a photolithography process is needed for the "thin film" during the whole manufacturing process, it is referred to as a "thin film" before the patterning process and referred to as a "layer" after the patterning process. The "layer" after the patterning process or photolithography process includes at least one "pattern".

In an exemplary embodiment, a preparation method of a display panel, including the following acts. Firstly, a first substrate 1 and a second substrate 2 are prepared respectively, the first substrate 1 includes a common electrode layer 11, a black matrix layer 12, and a color filter layer 13 which are sequentially disposed on a first base substrate 10, and the second substrate 2 includes an array structure layer 21, a shielding layer 22, an insulating layer 23, and a reflective layer 24 which are sequentially disposed on the second base substrate 20. Then, a liquid crystal 3 and a spacer 4 are dripped on one of the substrates, a frame sealant is coated on the other substrate, the first substrate 1 and the second substrate 2 are aligned. Pressing and curing of the frame sealant under vacuum conditions are performed to form a liquid crystal display panel. Finally, a first polarizer 14 is attached to an outside of the first substrate 1 and a second polarizer 25 is attached to an outside of the second substrate 2.

The preparation of the first substrate 1 includes the following acts.

(1) A polymer photoresist layer mixed with a black matrix material is coated on the first base substrate 10, and after exposure and development, a pattern of the black matrix layer 12 is formed. The black matrix layer 12 includes a first black matrix 12a and a second black matrix 12b. A position of the first black matrix 12a corresponds to a position of the spacer 4 formed later, that is, an orthographic projection of the first black matrix 12a on the first base substrate 10 covers an orthographic projection of the spacer 4 on the first base substrate 10, a position of the second black matrix 12b corresponds to a position of a first via formed later on a second insulating layer 215, that is, an orthographic projection of the second black matrix 12b on the first base substrate 10 covers an orthographic projection of the first via on the first base substrate 10. The black matrix layer 12 is used to shield light at a light leakage position. In the embodiment of the present disclosure, the light leakage position includes positions corresponding to the spacer 4 and the first via of the second insulating layer 215 on the second substrate 2.

In some exemplary embodiments, a distance between an edge of the orthographic projection of the first black matrix 12a on the first base substrate 10 and an edge of the orthographic projection of the corresponding spacer 4 on the first base substrate 10 is 1 μm to 3 nm. Exemplarily, the distance between the edge of the orthographic projection of the first black matrix 12a on the first base substrate 10 and the edge of the orthographic projection of the corresponding spacer 4 on the first base substrate 10 is 2 μm.

A distance between an edge of the orthographic projection of the second black matrix 12b on the first base substrate 10 and an edge of the orthographic projection of the corresponding first via on the first base substrate 10 is 1 μm to 3 μm. Exemplarily, the distance between the edge of the orthographic projection of the second black matrix 12b on the first base substrate 10 and the edge of the orthographic projection of the corresponding first via on the first base substrate 10 is 2 μm.

(2) A polymer photoresist layer mixed with a red pigment is coated on the first base substrate 10 formed with the aforementioned pattern, and after exposure and development, a pattern of red photoresist is formed. Patterns of green photoresist and blue photoresist are sequentially formed by using the same method and acts, and the red photoresist, the green photoresist, and the blue photoresist are arranged according to a set rule to form a color filter layer 13.

The red photoresist forms a red sub-pixel, the green photoresist forms a green sub-pixel, and the blue photoresist forms a blue sub-pixel, these sub-pixels are arranged according to a set rule to form a pixel. The red photoresist is used to filter red light, the green photoresist is used to filter green light, and the blue photoresist is used to filter blue light. In actual implementation, the first substrate 1 may not include the color filter layer 13, but the color filter layer 13 is disposed on the second substrate 2. The color filter layer 13 may also be disposed with four sub-pixels to form a pixel, for example, the four sub-pixels are a red sub-pixel, a green sub-pixel, a blue sub-pixel, and a white sub-pixel.

(3) On the first substrate 10 formed with the aforementioned pattern, a layer of Indium Tin Oxide (ITO) thin film is deposited on the first base substrate 10 by a method such as coating, magnetron sputtering, thermal evaporation or Plasma Enhanced Chemical Vapor Deposition (PECVD) to obtain the common electrode layer 11.

Then, a planarization layer and a rubbing layer are formed on the first base substrate 10 formed with the aforementioned pattern, and the rubbing layer is subjected to a rubbing treatment to complete the preparation of the first substrate 1.

The preparation of the second substrate 2 includes the following acts.

(I) A pattern of the array structure layer 21 is formed on the second base substrate 20.

The forming of the array structure layer 21 includes the following acts.

(a) A pattern of a gate metal layer is formed. The forming of the pattern of the gate metal layer includes: depositing a first metal thin film on the second base substrate 20, patterning the first metal thin film through a patterning process, and forming patterns of a gate line (not shown in the figure) and a gate electrode 210 on the second base substrate 20, wherein the gate line and the gate electrode 210 may be an integral structure.

(b) A pattern of an active layer 212 is formed. The forming of the pattern of the active layer 212 includes: sequentially depositing a first insulating thin film and an active layer thin film on the second base substrate 20 formed with the aforementioned pattern, and patterning the active layer thin film through a patterning process to form a first insulating layer 211 covering the pattern of the gate metal layer, and a pattern of the active layer 212 disposed on the first insulating layer 211, wherein a position of the active layer 212 corresponds to a position of the gate electrode 210.

(c) A pattern of a source-drain metal layer is formed. The forming of the pattern of the source-drain metal layer includes: depositing a second metal thin film on the second base substrate 20 formed with the aforementioned pattern, patterning the second metal thin film through a patterning process to form patterns of a data line (not shown in the figure), a source electrode 213, and a drain electrode 214 disposed on the first insulating layer 211. The source electrode 213 and the data line may be connected to each other in an integral structure, an end of the source electrode 213 adjacent to the drain electrode 214 is disposed on the active layer 212, an end of the drain electrode 214 adjacent to the source electrode 213 is disposed on the active layer 212, and a conductive channel is formed between the source electrode 213 and the drain electrode 214.

(d) A pattern of a via is formed. The forming of the pattern of the via includes: depositing a second insulating thin film on the second base substrate 20 formed with the aforementioned pattern, forming a second insulating layer 215 covering the pattern of the source-drain metal layer, patterning the second insulating layer 215 through a patterning process to form a pattern of a first via K1, and etching away the second insulating layer 215 in the first via K1 to expose a surface of the drain electrode 214.

(e) A pattern of a connection electrode 216 is formed. The forming of the pattern of the connection electrode 216 includes: depositing a transparent conductive thin film on the second base substrate 20 formed with the aforementioned pattern and patterning the transparent conductive thin film through a patterning process to form the pattern of the connection electrode 216, wherein the connection electrode 216 is connected to the drain electrode 214 through the first via K1.

In the embodiment of the present disclosure, the first metal thin film and the second metal thin film may be made of a metal material, such as silver (Ag), copper (Cu), aluminum (Al), or molybdenum (Mo), or an alloy material consisting of the above metals, and may be in a single-layer structure or a multi-layer composite structure. The first insulating thin film and the second insulating thin film may be made of silicon oxide (SiOx), silicon nitride (SiNx), silicon oxynitride (SiON), etc., or made of aluminum oxide (AlOx), hafnium oxide (HfOx), tantalum oxide (TaOx), etc., and may be a single-layer, a multi-layer, or a composite layer, and deposited through Chemical Vapor Deposition (CVD) or Plasma Enhanced Chemical Vapor Deposition (PECVD). Generally, the first insulating layer 211 is referred to as a Gate Insulator (GI) layer, and the second insulating layer 215 is referred to as a passivation (PVX) layer. The transparent conductive thin film is made of amorphous Indium Tin Oxide (α-ITO), and deposited through a magnetron sputtering method (Sputter).

(II) A third metal thin film is deposited on the second base substrate 20 formed with the aforementioned pattern, and the third metal thin film is patterned through a patterning process to form a pattern of a shielding layer 22 disposed on the array structure layer 21. A position of the shielding layer 22 corresponds to a position of a first space area 100 formed later, and is used for limiting light emitted by each sub-pixel to be emitted in its corresponding pixel, shielding lateral light leakage of the pixel, and preventing color mixing of a transmissive picture.

In some exemplary embodiments, the shielding layer 22 includes multiple light shielding units arranged sequentially along a first direction x, each light shielding unit extends along a second direction y, and a width of each light shielding unit in the first direction x is larger than that of the first space area 100 formed later in the first direction x.

In some exemplary embodiments, the width of each light shielding unit in the first direction x is 8.0 μm.

In some exemplary embodiments, the third metal thin film may be made of a metal material, such as molybdenum (Mo).

(III) A third insulating thin film and a fourth metal thin film are sequentially deposited on the second base substrate 20 formed with the aforementioned pattern, to form a third insulating layer 23 covering the pattern of the shielding layer 22, and a pattern of a reflective layer 24 disposed on the third insulating layer 23.

In some exemplary embodiments, the reflective layer 24 includes multiple reflective units arranged in an array along the first direction x and the second direction intersecting with each other, and the multiple reflective units form multiple reflective rows and multiple reflective columns. A first space area 100 is formed by space areas between the multiple reflective columns, and a second space area 200 is formed by space areas between the multiple reflective rows.

In some exemplary embodiments, each light shielding unit includes a first edge and a second edge, which are disposed opposite to each other in the first direction x. The first space area 100 includes a third edge and a fourth edge, which are disposed opposite to each other in the first direction x. A space between the first edge of each light shielding unit and the third edge of the corresponding first space area 100 is 2 μm. A space between the second edge of each light shielding unit and the fourth edge of the corresponding first space area 100 is 2 m.

In some exemplary embodiments, a width of the first space area 100 in the first direction x is 4 μm, and a width of the second space area 200 in the second direction y is 8 μm.

In the embodiment of the present disclosure, the fourth metal thin film may be made of silver (Ag) and deposited through a magnetron sputtering method (Sputter). The third insulating thin film may be made of silicon oxide (SiOx), silicon nitride (SiNx), silicon oxynitride (SiON), etc., or made of aluminum oxide (AlOx), hafnium oxide (HfOx), tantalum oxide (TaOx), etc., and may be a single-layer, a multi-layer, or a composite layer, and may be deposited through Chemical Vapor Deposition (CVD) or Plasma Enhanced Chemical Vapor Deposition (PECVD).

Then, a rubbing layer is formed on the second base substrate 20 formed with the aforementioned pattern, and a rubbing treatment is performed on the rubbing layer to complete the preparation of the second substrate 2.

A double compensation design is adopted for the first polarizer 14, which includes a first Optically Clear Adhesive (OCA) layer 141, a scattering film 142, a first adhesive layer 143, a first quarter-wave plate 144, a second adhesive layer 145, a half-wave plate 146, a third adhesive layer 147, a first cellulose triacetate (TAC) layer 148, a first poly vinyl alcohol (PVA) layer 149, and a second cellulose triacetate (TAC) layer 150 which are sequentially stacked from bottom to top. An absorption axis angle of the first poly vinyl alcohol layer 149 is n°, a slow axis angle of the half-wave plate 146 is ((n+41)%180)° to ((n+43)%180)°, and a slow axis angle of the first quarter-wave plate 144 is ((n+162)%180)° to ((n+164)%180)°, n is between 0 and 180.

Exemplarily, the absorption axis angle of the first PVA layer 149 may be set to 20°. The half-wave plate 146 may be made of a COP material, a phase compensation value may be 265 nm to 275 nm, exemplarily, the phase compensation value may be 270 nm, and a slow axis angle may be 41.5° to 42.5°, exemplarily, the slow axis angle may be 42°. The first quarter-wave plate 144 may be made of a COP material, a phase compensation value may be 105 nm to 115 nm, exemplarily, the phase compensation value may be 110 nm, and a slow axis angle may be 162.5° to 163.5°, exemplarily, the slow axis angle may be 163°. The first TAC layer 148 and the second TAC layer 150 are both 0-TAC.

A phase retardation amount (value of Re) of the liquid crystal layer 3 is 213.5 nm to 214.5 nm. Exemplarily, the phase retardation amount of the liquid crystal layer 3 is 214 nm. A rubbing angle of the first substrate 1 is −109.5° to −108.5°, and a rubbing angle of the second substrate 2 is 122.5° to 123.5°, and a TA of the liquid crystal layer 3 is 51.5° to 52.5°. Exemplarily, the rubbing angle of the first substrate 1 is −109°, and the rubbing angle of the second substrate 2 is 123°, and the TA is 52°.

A single compensation design is adopted for the second polarizer 25, which includes a second Optically Clear Adhesive (OCA) layer 251, a second quarter-wave plate 252, a fourth adhesive layer 253, a third cellulose triacetate (TAC) layer 254, a second poly vinyl alcohol (PVA) layer 255, a fourth cellulose triacetate (TAC) layer 256, a fifth adhesive layer 257, and an Advanced Patterning Film (APF) layer 258 which are sequentially stacked from bottom to top. An absorption axis angle of the second PVA layer 255 is ((n+89)%180)° to ((n+91)%180)°, and a slow axis angle of the second quarter-wave plate 252 is ((n+134)%180)° to ((n+136)%180)°.

Exemplarily, the absorption axis angle of the second PVA layer 255 is 109.5° to 110.5°, for example, the absorption axis angle of the second PVA layer 255 is 110°. The second quarter-wave plate 252 is made of a COP material, a phase compensation value may be 135 nm to 145 nm, and a slow axis angle is 154.5° to 155.5°, exemplarily, the phase compensation value may be 140 nm, and the slow axis angle is 155°. The third TAC layer 254 and the fourth TAC layer 256 are both 0-TAC.

In other exemplary embodiments, a preparation method of a display panel, including the following acts. Firstly, a first substrate 1 and a second substrate 2 are prepared respectively, the first substrate 1 includes a first base substrate 10, and a black matrix layer 11, a color filter layer 12 and a common electrode layer 14 which are sequentially disposed on a first base substrate 10, and the second substrate 2 includes a second based substrate 20 and a buffer layer 21, a shielding layer 22, an array structure layer 23, an insulating layer 24, and a reflective layer 25 which are sequentially disposed on the second base substrate 20. Then, a liquid crystal 3 and a spacer 4 are dripped on one of the substrates, a frame sealant is coated on the other substrate, the first substrate 1 and the second substrate 2 are aligned. Pressing and curing of the frame sealant under vacuum conditions are performed to form a liquid crystal display panel. Finally, a first polarizer 15 is attached to an outside of the first substrate 1 and a second polarizer 27 is attached to an outside of the second substrate 2.

The preparation of the first substrate 1 includes the following acts.

(1) A polymer photoresist layer mixed with a black matrix material is coated on the first base substrate 10, and after exposure and development, a pattern of the black matrix layer 11 is formed. The black matrix layer 11 includes a first black matrix 11a and a second black matrix 11b. A position of the first black matrix 11a corresponds to a position of the spacer 4 formed later, that is, an orthographic projection of the first black matrix 11a on the first base substrate 10 covers an orthographic projection of the spacer 4 on the first base substrate 10, a position of the second black matrix 11b corresponds to a position of a first via K1 formed later on a second insulating layer 24, that is, an orthographic projection of the second black matrix 11b on the first base substrate 10 covers an orthographic projection of the first via K1 on the first base substrate 10. The black matrix layer 11 is used to shield light at a light leakage position. In the embodiment of the present disclosure, the light leakage position includes positions corresponding to the spacer 4 and the first via K1 of the second insulating layer 24 on the second substrate 2.

In some exemplary embodiments, a distance between an edge of the orthographic projection of the first black matrix 11a on the first base substrate 10 and an edge of the orthographic projection of the corresponding spacer 4 on the first base substrate 10 is 1 μm to 3 μm. Exemplarily, the distance between the edge of the orthographic projection of the first black matrix 11a on the first base substrate 10 and the edge of the orthographic projection of the corresponding spacer 4 on the first base substrate 10 is 2 μm.

A distance between an edge of the orthographic projection of the second black matrix 11b on the first base substrate 10 and an edge of the orthographic projection of the corresponding first via on the first base substrate 10 is 1 μm to 3 μm. Exemplarily, the distance between the edge of the orthographic projection of the second black matrix 11b on the first base substrate 10 and the edge of the orthographic projection of the corresponding first via on the first base substrate 10 is 2 μm.

(2) A polymer photoresist layer mixed with a red pigment is coated on the first base substrate 10 formed with the aforementioned pattern, and after exposure and development, a pattern of red photoresist is formed. Patterns of green photoresist and blue photoresist are sequentially formed by using the same method and acts, and the red photoresist, the green photoresist, and the blue photoresist are arranged according to a set rule to form a color filter layer 12.

The red photoresist, the green photoresist and the blue photoresist respectively form a red sub-pixel, a green sub-pixel and a blue sub-pixel, which are arranged according to a set rule to form a pixel. Red, green, and blue photoresists are used to transmit red, green, and blue light through filters, respectively. In actual implementation, the first substrate 1 may not include the color filter layer 12, but the color filter layer 12 is disposed on the second substrate 2. The color filter layer 12 may also be disposed with four sub-pixels to form a pixel, for example, the four sub-pixels are a red sub-pixel, a green sub-pixel, a blue sub-pixel, and a white sub-pixel.

(3) A protective film OC is deposited the first base substrate 10 formed with the aforementioned pattern to obtain a protective layer 13.

(4) On the first substrate 10 formed with the aforementioned pattern, a layer of Indium Tin Oxide (ITO) thin film is deposited on the first base substrate 10 by a method such as coating, magnetron sputtering, thermal evaporation or Plasma Enhanced Chemical Vapor Deposition (PECVD) to obtain the common electrode layer 14.

(5) A polyimide (PI) solution is coated on the first base substrate 10 formed with the aforementioned pattern, and the coated PI solution is heated to volatilize the organic solvent in the PI solution to form a first alignment film 16 having a certain thickness, thereby completing the preparation of the first substrate 1.

The preparation of the second substrate 2 includes the following acts.

(I) A first insulating film and a first metal film are sequentially deposited on the second base substrate 20, and the first metal film is patterned by a patterning process to form a pattern of a first insulating layer (i.e., a buffer layer) 21 and a shielding layer 22 disposed on the second base substrate 20. A position of the shielding layer 22 corresponds to a position of a first space area 100 formed later, and is used for limiting light emitted by each sub-pixel to be emitted in its corresponding pixel, shielding lateral light leakage of the pixel, and preventing color mixing of a transmissive picture.

In some exemplary embodiments, the shielding layer 22 includes s a plurality of groups of light shielding units sequentially arranged along a first direction x, each group of the light shielding units includes a plurality of independent sub-light shielding units 22a sequentially arranged along a second direction y.

In some exemplary embodiments, each of the light shielding units includes a first light shielding part 221 and a second light shielding part 222, an orthographic projection of the first light shielding part 221 on the second base substrate 20 is not overlapped with an orthographic projection of the second space area 200 formed subsequently on the second base substrate 20; an orthographic projection of the second light shielding part 222 on the second base substrate 2θ is overlapped with the orthographic projection of the second space area 200 formed subsequently on the second base substrate 20, and a width of the second light-shielding portion 222 in the first direction x is smaller than a width of the first light-shielding portion 221 in the first direction x.

In some exemplary embodiments, the width W2 of the second light shielding part 222 in the first direction x is between 3 μm and 5 μm. Exemplarily the width W2 of the second light shielding part 222 in the first direction x may be 4.0 μm.

In some exemplary embodiments, the width W3 of the first light shielding part 221 in the first direction x is between 5 μm and 8 μm. Exemplarily the width W3 of the first light shielding part 221 in the first direction x may be 6.4 μm.

(II) A pattern of the array structure layer 23 is formed on the second base substrate 20 formed with the aforementioned pattern.

The forming of the array structure layer 23 includes the following acts.

(α) A pattern of an active semiconductor layer 231 is formed. The forming of the pattern of the active semiconductor layer 231 includes: sequentially depositing a second insulating film and an active layer thin film on the second base substrate 20 formed with the aforementioned pattern, and patterning the active layer thin film through a patterning process to form a second insulating layer covering the pattern of the shielding layer 22, and a pattern of the active semiconductor layer 231 disposed on the second insulating layer, wherein a position of the active semiconductor layer 231 corresponds to a position of the gate electrode 233*b* formed sequent.

(b) A pattern of a gate electrode layer 233 is formed. The forming of the pattern of the gate electrode layer 233 includes: depositing a third insulating film and a second metal film sequentially on the second base substrate 20 formed with the aforementioned pattern, patterning the second metal film through a patterning process, forming a third insulating layer 232 covering the pattern of the active semiconductor layer 231, and disposing a pattern of the gate electrode layer 233 on the third insulating layer 232. The gate electrode layer 233 may include patterns of at least one gate line 233*a* and at least one gate electrode 233*b*, and the gate line 233*a* and the gate electrode 233*b* may have an integral structure.

(c) A pattern of a source-drain electrode layer is formed. The forming of the pattern of the source-drain electrode layer includes: depositing a fourth insulating film and a third metal film on the second base substrate 20 formed with the aforementioned pattern, patterning the fourth insulating film and the third metal film each through a patterning process, and forming a pattern of the a fourth insulating layer 234 and a source-drain electrode layer disposing on the gate electrode layer 233. The source-drain electrode layer may include patterns of data lines (not shown), the source electrode 235*a* and the drain electrode 235*b*. The source electrode 235*a* and the data line may be connected to each other in an integral structure, an end of the source electrode 235*a* adjacent to the drain electrode 235*b* is connected to one end of the active semiconductor layer 231 through a via hole on the fourth insulating layer 234, an end of the drain electrode 235*b* adjacent to the source electrode 235*a* is connected to the other end of the active semiconductor layer 231 through a via hole on the fourth insulating layer 234, and a conductive channel is formed between the source electrode 235*a* and the drain electrode 235*b*.

(III) A pattern of the insulating layer 24 is formed on the second base substrate 20 formed with the aforementioned pattern.

The forming of the pattern of the insulating layer 24 includes: depositing a fifth insulating film on the second base substrate 20 formed with the aforementioned pattern, forming the insulating layer 24 covering the pattern of the source-drain electrode layer, patterning the insulating layer 24 by a patterning process, forming a pattern of a first via K1, and etching the insulating layer 24 in the first via K1 to expose the surface of the drain electrode 235B.

(IV) The reflective layer 25 pattern is formed. The forming of the pattern of the reflective layer 25 includes: depositing a transparent conductive film on the second base substrate 20 formed with the aforementioned pattern, patterning the transparent conductive film through a patterning process, and forming the pattern of the reflective layer 25. The reflective layer 25 includes a plurality of reflective units 25*a* arranged in an array along the first direction x and the second direction y, the plurality of reflective units 25*a* form a plurality of reflective rows and a plurality of reflective columns, a space area between adjacent reflective columns forms a first space area 100, and a space area between adjacent reflective rows forms a second space area 200. The reflective unit 25*a* is connected with the drain electrode 235*b* through the first via K1, and the reflective unit 25*a* is used as a pixel electrode.

In the embodiment of the present disclosure, the first metal film may be made of a metal material, such as molybdenum (Mo). The second metal film and the third metal thin film may be made of a metal material, such as silver (Ag), copper (Cu), aluminum (Al) or molybdenum (Mo), or an alloy material consisting of the above metals, and may be in a single-layer structure or a multi-layer composite structure. The first insulating film to the fourth insulating thin film may be made of silicon oxide (SiOx), silicon nitride (SiNx), silicon oxynitride (SiON), etc., or made of aluminum oxide (AlOx), hafnium oxide (HfOx), tantalum oxide (TaOx), etc., and may be a single-layer, a multi-layer, or a composite layer, and deposited through Chemical Vapor Deposition (CVD) or Plasma Enhanced Chemical Vapor Deposition (PECVD). Generally, the third insulating layer 232 is referred to as a Gate Insulator (GI) layer, and the fourth insulating layer 234 is referred to as a passivation (PVX) layer. The insulating layer 24 is referred to as a planarization (PLN) layer. Transparent conductive films can be deposited with ITO-Ag-ITO alloy through a magnetron sputtering method (Sputter).

In some exemplary embodiments, The first space area 100 includes a first sub-region 101 and a second sub-region 102, an orthographic projection of the first sub-region 101 on the second base substrate 20 is overlapped with an orthographic projection of a spacing area between two adjacent sub-light shielding units 22*a* in each group on the second base substrate 20, and an orthographic projection of the second sub-region 102 on the second base substrate 20 is not overlapped with an orthographic projection of a space area between two adjacent sub-light shielding unit 22*a* in each group on the second base substrate 20. An orthographic projection of at least one gate line 233*a* on the second base substrate 20 covers an orthographic projection of the first sub-region 101 on the second base substrate 20, and an orthographic projection of the light shielding unit on the second base substrate 20 covers an orthographic projection of the second sub-region 102 on the second base substrate 20.

(V) A polyimide (PI) solution is coated on the second base substrate 20 formed with the aforementioned pattern, and the coated PI solution is heated to volatilize the organic solvent in the PI solution to form second alignment film 26 having a certain thickness, thereby completing the preparation of the second substrate 2.

After the preparation of the first substrate 1 and the second substrate 2 is completed, the first substrate 1 and the second substrate 2 is cell-assembled, and liquid crystal is filled between the first substrate 1 and the second substrate 2. Subsequently, a first polarizer 15 is attached on the side of the first substrate 1 away from the second substrate 2, and a second polarizer 27 is attached on the side of the second substrate 2 away from the first substrate 1.

A double compensation design is adopted for the first polarizer 15, which includes a first Optically Clear Adhesive (OCA) layer 151, a scattering film 152, a first adhesive layer 153, a first quarter-wave plate 154, a second adhesive layer 155, a half-wave plate 156, a third adhesive layer 157, a first cellulose triacetate (TAC) layer 158, a first poly vinyl alcohol (PVA) layer 159, and a second cellulose triacetate (TAC) layer 160 which are sequentially arranged along the direction away from the second substrate 2. An absorption axis angle of the first poly vinyl alcohol layer 159 is n°, a slow axis angle of the half-wave plate 156 is $((n+21)\%180)°$ to ((n+23)%180)°, and a slow axis angle of the first quarter-wave plate 154 is ((n+142)%180)° to ((n+144)%180)°, n is between 0 and 180.

Exemplarily, the absorption axis angle of the first PVA layer 159 may be set to 35°. The half-wave plate 156 may be made of a COP material, a phase compensation value may be 265 nm to 275 nm, exemplarily, the phase compensation value may be 270 nm, and a slow axis angle may be 56.5° to 57.5°, exemplarily, the slow axis angle may be 57°. The first quarter-wave plate 154 may be made of a COP material, a phase compensation value may be 105 nm to 115 nm, exemplarily, the phase compensation value may be 110 nm, and a slow axis angle may be 177.5° to 178.5°, exemplarily, the slow axis angle may be 178°. The first TAC layer 158 and the second TAC layer 160 are both 0-TAC.

A phase retardation amount (value of Re) of the liquid crystal layer 3 is 213.5 nm to 214.5 nm. Exemplarily, the phase retardation amount of the liquid crystal layer 3 is 214 nm. A rubbing angle of the first substrate 1 is −94.5° to −93.5°, and a rubbing angle of the second substrate 2 is 137.5° to 138.5°, and a TA of the liquid crystal layer 3 is 51.5° to 52.5°. Exemplarily, the rubbing angle of the first substrate 1 is −94°, and the rubbing angle of the second substrate 2 is 138°, and the TA is 52°.

A single compensation design is adopted for the second polarizer 27, which includes a second Optically Clear Adhesive (OCA) layer 271, a second quarter-wave plate 272, a fourth adhesive layer 273, a third cellulose triacetate (TAC) layer 274, a second poly vinyl alcohol (PVA) layer 275, a fourth cellulose triacetate (TAC) layer 276, a fifth adhesive layer 277, and an Advanced Patterning Film (APF) layer 278 which are sequentially arranged along the direction away from the first substrate 1. An absorption axis angle of the second PVA layer 275 is ((n+89)%180)° to ((n+91)%180)°, and a slow axis angle of the second quarter-wave plate 272 is ((n+139)%180)° to ((n+141)%180)°.

Exemplarily, the absorption axis angle of the second PVA layer 275 is 124.5° to 125.5°, for example, the absorption axis angle of the second PVA layer 275 is 125°. The second quarter-wave plate 272 is made of a COP material, a phase compensation value may be 135 nm to 145 nm, and a slow axis angle is 174.5° to 175.5°, exemplarily, the phase compensation value may be 140 nm, and the slow axis angle is 175°. The third TAC layer 274 and the fourth TAC layer 276 are both 0-TAC.

It may be seen from the above introduction of this embodiment that the display panel according to the embodiment of the present disclosure is disposed with multiple light shielding units or multiple "patches" BM, so that the whole display panel does not need to be disposed with a strip-shaped black matrix for avoiding color mixing of a transmissive picture. Thus, the whole display panel may achieve a design of a maximum reflectivity without influence of process problems such as BM peeling or fluctuation of alignment, and a color mixing ratio of the transmissive picture may be reduced to below 5%, thereby improving user experience. For the preparation of the liquid crystal display panel in this embodiment, an existing process equipment and process method may be adopted, and has advantages of easy achievement, good process compatibility, low production cost, high product quality, and good application prospects.

In addition, according to the embodiment of the present disclosure, an optical path and a compensation value of a compensation plate are designed through a Poincare sphere model, and a ratio of RGB light output in an L0 state is adjusted, blue light beyond a pole point position adjusts an angle of a compensation film, so that it travels a proper distance to just reach a pole point, while red and green light fail to reach the pole point, as a result, a leakage amount of the red and green light is more than a leakage amount of the blue light in the L0 state, and a problem of bluing and color shift in the L0 state is improved.

In this embodiment, a structure of the common electrode layer, the first polarizer, and the color filter layer in the first substrate is only an example, and in actual implementation, disposed positions of the three film layers may be adjusted according to actual needs. For example, the first polarizer may be disposed on the color filter layer. In addition, the first substrate may not include the color filter layer, but the color filter layer may be disposed on the second substrate, and the first substrate and the second substrate may further include other film layers, which can be known and expanded by those skills in the art according to common knowledge and existing technologies, and are not limited here.

In some exemplary implementations, the display panel provided by an embodiment of the present disclosure may further include a touch structure layer, and the touch structure layer is disposed on the outer side of the first substrate (ie, the side of the first substrate away from the second substrate). In an exemplary embodiment, the touch structure layer can be formed by an On Cell process, before the first polarizer 15 is attached, ITO metal blocks are fabricated on the side of the first substrate 1 away from the second substrate 2 by coating, developing and etching processes, and the metal lines of each block are concentrated at one side position of the display panel (i.e., the binding area), and the bonding operation of the touch chip (IC) is performed at this position, thereby realizing the touch function of the display panel. In this example the touch structure layer is located between the first base substrate 10 and the first polarizer 15.

Figure 19:
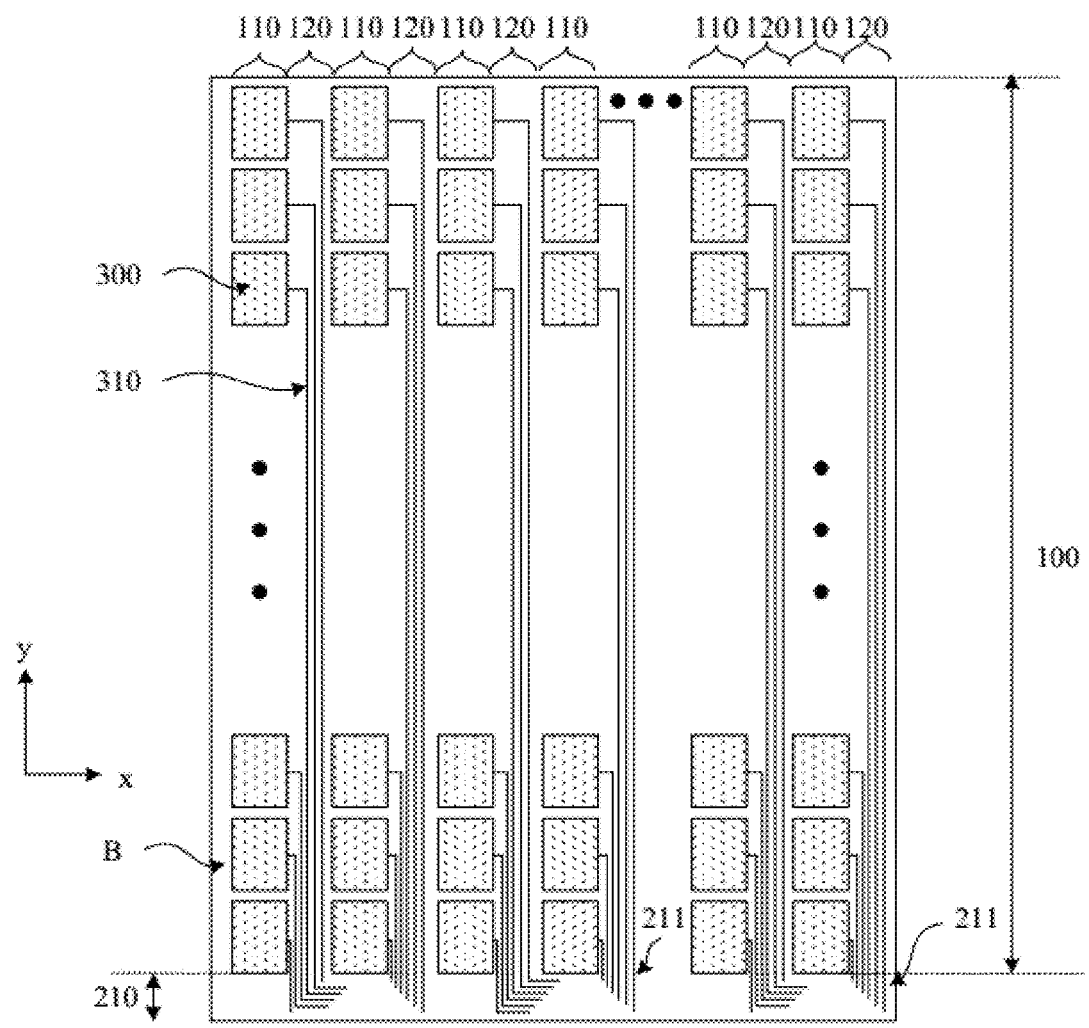
FIG. 19 is a schematic diagram of a planar structure of a touch structure layer in a display panel according to an embodiment of the present disclosure.

FIG. 19 is a schematic diagram of a planar structure of a touch structure layer in a display panel according to an embodiment of the present disclosure, and illustrates a self-capacitance structure. As shown in FIG. 19, in a plane parallel to the display panel, the touch panel includes a touch control area 100 and a binding area 210 located on one side of the second direction y of the touch control area 100. The touch control area 100 includes a plurality of touch electrodes 300 arranged regularly. Exemplarily, the touch electrodes 300 may be rectangular and arranged in a matrix of M*N, and both M and N are natural numbers greater than 1. The touch control area 100 can be divided into N electrode areas 110 and N lead areas 120, and the electrode areas 110 and the lead areas 120 are strip shapes extending along the second direction y. The strip-shaped electrode areas 110 and the strip-shaped lead areas 120 are alternately arranged along the first direction x, that is, except for the electrode area and the lead area at the edge position, one lead area 120 is arranged between the two electrode areas 110, and one electrode area 110 is arranged between the two electrode areas 120. Each electrode area 110 includes M touch electrodes 300 arranged in sequence along the second direction y, and each lead area 120 includes M touch traces 310 arranged in sequence along the first direction x. The first end of each touch trace 310 is connected to one touch electrode 300, and the second end extends to the binding area 210 along the second direction y.

In another exemplary embodiment, the touch structure layer can also be formed by a GFF (Glass Film Film) bonding technology. In this case, two layers of conductive coatings are combined with the base material to form the touch structure layer, and the formed touch structure layer is directly attached to the side of the first substrate 1 where the first polarizer 15 is away from the second substrate 2, to realize the touch function of the display panel. In this example, the touch structure layer is located on the side of the first polarizer 15 away from the first base substrate 10.

Figure 20:
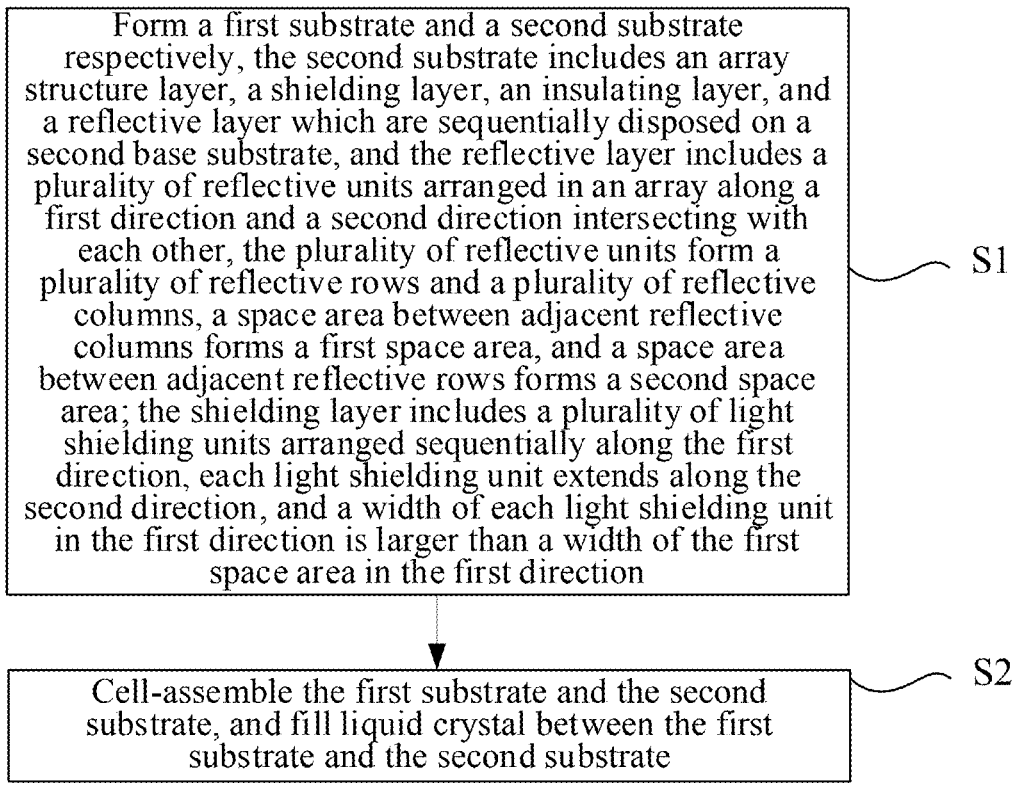
FIG. 20 is a schematic flowchart of a preparation method of a display panel according to an embodiment of the present disclosure.

As shown in FIG. 20, an embodiment of the present disclosure further provides a preparation method of a display panel, including the following acts.

In S1, a first substrate and a second substrate are formed respectively, the second substrate includes an array structure layer, a shielding layer, an insulating layer, and a reflective layer which are sequentially disposed on a second base substrate, and the reflective layer includes multiple reflective units arranged in an array along a first direction and a second direction intersecting with each other. The multiple reflective units form multiple reflective rows and multiple reflective columns, a space area between adjacent reflective columns forms a first space area, and a space area between adjacent reflective rows forms a second space area; the shielding layer includes multiple light shielding units arranged sequentially along the first direction, each light shielding unit extends along the second direction, and a width of each light shielding unit in the first direction is larger than a width of the first space area in the first direction.

In S2, the first substrate and the second substrate is cell-assembled, and liquid crystal is filled between the first substrate and the second substrate.

In some exemplary embodiments, the first substrate includes a common electrode layer, a black matrix layer, and a color filter layer which are sequentially disposed on a first base substrate, and at least one of the first substrate and the second substrate further includes a spacer.

The black matrix layer includes a first black matrix and a second black matrix, and an orthographic projection of the first black matrix on the first base substrate covers an orthographic projection of the spacer on the first base substrate.

The array structure layer includes a gate electrode disposed on the second base substrate, a first insulating layer covering the gate electrode, an active layer disposed on the first insulating layer, a source electrode and a drain electrode disposed on the first insulating layer and the active layer, a second insulating layer covering the source electrode and the drain electrode, and a connection electrode disposed on the second insulating layer. The second insulating layer is disposed with at least one first via, and the connection electrode is connected to the drain electrode through the first via, an orthographic projection of the second black matrix on the first base substrate covers an orthographic projection of the first via on the first base substrate.

A material of the reflective layer is metal, exemplarily, silver (Ag). A material of the connection electrode is a transparent conductive material, exemplarily, amorphous Indium Tin Oxide (α-ITO).

An embodiment of the present disclosure further provides a preparation method of a display panel, including the following acts.

In S1', a first substrate and a second substrate are formed respectively, the first substrate includes a black matrix layer and a color filter layer which are sequentially disposed on a first base substrate; at least one of the first substrate and the second substrate further includes a spacer, the black matrix layer includes at least one first black matrix, and an orthographic projection of each first black matrix on the first base substrate covers an orthographic projection of the spacer on the first base substrate.

In S2', the first substrate and the second substrate is cell-assembled, and liquid crystal is filled between the first substrate and the second substrate.

In some exemplary embodiments, the preparation method further includes: attaching a first polarizer to a side of the first substrate away from the second substrate, and attaching a second polarizer to a side of the second substrate away from the first substrate.

An embodiment of the present disclosure further provides a preparation method of a display panel, including the following acts.

In S1", a first substrate and a second substrate are formed respectively.

In S2", the first substrate and the second substrate is cell-assembled, and liquid crystal is filled between the first substrate and the second substrate.

In S3''', a first polarizer is attached to a side of the first substrate away from the second substrate, the first polarizer includes a first quarter-wave plate, a second adhesive layer, a half-wave plate, a third adhesive layer, a first triacetate cellulose layer, a first poly vinyl alcohol layer, and a second triacetate cellulose layer which are sequentially stacked from bottom to top, an absorption axis angle of the first poly vinyl alcohol layer is n°; a slow axis angle of the half-wave plate is $((n+41)\%180)°$ to $((n+43)\%180)°$, a slow axis angle of the first quarter-wave plate is $((n+162)\%180)°$ to $((n+164)\%180)°$, and n is between 0 and 180.

The preparation process of the display panel and the structures of the first polarizer and the second polarizer have been described in detail in the previous embodiments, and will not be repeated here.

An embodiment of the present disclosure further provides a preparation method of a display panel, including the following acts.

In S1, a first substrate and a second substrate are formed respectively. The second substrate includes a second base substrate and a shielding layer, an array structure layer, an insulating layer and a reflective layer which are sequentially disposed on the second base substrate, the array structure layer includes a gate electrode layer, and the gate electrode layer includes a plurality of gate lines. The shielding layer includes a plurality of groups of light shielding units sequentially arranged along a first direction, each group of the light shielding units includes a plurality of independent sub-light shielding units sequentially arranged along a second direction. The sub-light shielding units extends along the second direction extend, and the first direction intersects with the second direction. The reflective layer includes a plurality of reflective units arranged in an array along the first direction and the second direction, the plurality of reflective units form a plurality of reflective rows and a plurality of reflective columns, a space area between adjacent reflective columns forms a first space area, and a space area between adjacent reflective rows forms a second space area. the first space area includes a first sub-region and a second sub-region, an orthographic projection of the first sub-region on the second base substrate is overlapped with an orthographic projection of a spacing area between two adjacent sub-light shielding units in each group on the second base substrate, and an orthographic projection of the second sub-region on the second base substrate is not overlapped with an orthographic projection of a space area between two adjacent sub-light shielding unit in each group on the second base substrate.

In S2, the first substrate and the second substrate is cell-assembled, and liquid crystal is filled between the first substrate and the second substrate.

In some exemplary embodiments, an orthographic projection of at least one gate line on the second base substrate covers an orthographic projection of the first sub-region on the second base substrate, and an orthographic projection of the light shielding unit on the second base substrate covers an orthographic projection of the second sub-region on the second base substrate.

In some exemplary embodiments, the array structure layer further includes an active semiconductor layer and a source-drain electrode layer, the source-drain electrode layer includes a source electrode and a drain electrode, the insulating layer is provided with a first via, and the reflective unit is connected to the drain electrode through the first via.

The first substrate includes a first base substrate and a black matrix layer, a color filter layer, and a common electrode layer which are sequentially disposed on the first base substrate, and at least one of the first substrate and the second substrate further includes a spacer.

The black matrix layer includes at least one first black matrix and at least one second black matrix, an orthographic projection of the at least one first black matrix on the first base substrate covers an orthographic projection of the spacer on the first base substrate; an orthographic projection of the at least one second black matrix on the first base substrate covers an orthographic projection of the first via on the first base substrate.

The material of the reflective layer can be a transparent conductive material, for example, an ITO-Ag-ITO alloy.

An embodiment of the present disclosure further provides a preparation method of a display panel, including the following acts.

In S1', a first substrate and a second substrate are formed respectively.

In S2', the first substrate and the second substrate is cell-assembled, and liquid crystal is filled between the first substrate and the second substrate.

In S3', a first polarizer is attached on the side of the first substrate away from the second substrate. the first polarizer includes a first quarter-wave plate, a second adhesive layer, a half-wave plate, a third adhesive layer, a first cellulose triacetate (TAC) layer, a first poly vinyl alcohol (PVA) layer, and a second cellulose triacetate (TAC) layer which are sequentially arranged along a direction away from the second substrate, wherein an absorption axis angle of the first poly vinyl alcohol (PVA) layer is n°, a slow axis angle of the half-wave plate is $((n+21)\%180)°$ to $((n+23)\%180)°$, a slow axis angle of the first quarter-wave plate is $((n+142)\%180)°$ to $((n+144)\%180)°$, and n is between 0 and 180.

The specific preparation process of the display panel and the structures of the first polarizer and the second polarizer have been described in detail in the previous embodiments, and will not be repeated here.

According to the preparation method of the display panel provided by the embodiment of the present disclosure, multiple light shielding units or at least one first black matrix are disposed, so that the whole display panel does not need to be disposed with a strip-shaped black matrix for avoiding color mixing of a transmissive picture. Thus, the whole display panel may achieve a design of a maximum reflectivity without influence of process problems such as BM peeling or fluctuation of alignment, and a color mixing ratio of the transmissive picture may be reduced to below 5%, thereby improving user experience.

In addition, according to the preparation method of the display panel provided by the embodiment of the present disclosure, an optical path and a compensation value of a compensation plate are designed through a Poincare sphere model, and a ratio of RGB light output in an L0 state is adjusted. Blue light beyond a pole point position adjusts an angle of a compensation film, so that it travels a proper distance to just reach a pole point, while red and green light fail to reach the pole point, a leakage amount of the red and green light is more than a leakage amount of the blue light in the L0 state, and a problem of bluing and color shift in the L0 state is improved.

An embodiment of the present disclosure further provides a display apparatus, including the aforementioned display panel. The display apparatus may be any product or component with a display function such as a mobile phone, a tablet computer, a television, a display, a notebook computer, a digital photo frame, and a navigator, or may be a wearable electronic device such as a smart watch and a smart wristband.

In recent years, smart wristbands (watches) are more and more popular among consumers because of their functions such as portability, timing, step counting, sleep monitoring, and color display, but their endurance is difficult to meet requirements of use. The transflective display apparatus provided by the embodiment of the present disclosure may effectively increase endurance of a smart wristband (watch).

Although the embodiments disclosed in the present disclosure are as described above, the content described is only the embodiments used to facilitate the understanding of the present disclosure, and is not intended to limit the present disclosure. Anyone skills in the art to which the present disclosure belongs may make any modifications and changes in implementation forms and details without departing from the spirit and scope disclosed in the present disclosure. However, the scope of patent protection of the present disclosure is still subject to the scope defined by the appended claims.

The invention claimed is:

1. A display panel, comprising: a first substrate and a second substrate disposed oppositely, and a liquid crystal layer sandwiched between the first substrate and the second substrate, wherein
the second substrate comprises a second base substrate and a shielding layer, an array structure layer, an insulating layer and a reflective layer which are sequentially disposed on the second base substrate, wherein the array structure layer comprises a gate electrode layer, and the gate electrode layer comprises a plurality of gate lines;
the shielding layer comprises a plurality of groups of light shielding units sequentially arranged along a first direction, each group of the light shielding units comprises a plurality of independent sub-light shielding units sequentially arranged along a second direction, wherein the first direction intersects with the second direction; the reflective layer comprises a plurality of reflective units arranged in an array along the first direction and the second direction, the plurality of reflective units form a plurality of reflective rows and a plurality of reflective columns, a space area between adjacent reflective columns forms a first space area, and a space area between adjacent reflective rows forms a second space area; and
the first space area comprises a first sub-region and a second sub-region, an orthographic projection of the first sub-region on the second base substrate is overlapped with an orthographic projection of a spacing area between two adjacent sub-light shielding units in each group on the second base substrate, and an orthographic projection of the second sub-region on the second base substrate is not overlapped with an orthographic projection of a space area between two adjacent sub-light shielding unit in each group on the second base substrate.

2. The display panel according to claim 1, wherein an orthographic projection of at least one gate line on the second base substrate covers an orthographic projection of the first sub-region on the second base substrate, and an orthographic projection of the light shielding unit on the second base substrate covers an orthographic projection of the second sub-region on the second base substrate.

3. The display panel according to claim 1, wherein a width of the first sub-region in the second direction is 2 μm to 4 μm.

4. The display panel according to claim 1, wherein
each of the light shielding units comprises a first light shielding part and a second light shielding part, an orthographic projection of the first light shielding part on the second base substrate is not overlapped with an orthographic projection of the second space area on the second base substrate; and
an orthographic projection of the second light shielding part on the second base substrate is overlapped with the orthographic projection of the second space area on the second base substrate, and a width of the second light-shielding portion in the first direction is smaller than a width of the first light-shielding portion in the first direction.

5. The display panel according to claim 4, wherein a width of the second light shielding part in the first direction is between 3 μm to 5 μm.

6. The display panel according to claim 4, wherein a width of the first light shielding part in the first direction is between 5 μm to 8 μm.

7. The display panel according to claim 4, wherein
the first light shielding part comprises a first edge and a second edge which are disposed oppositely to each other in the first direction,
the first space area comprises a third edge and a fourth edge which are disposed opposite to each other in the first direction,
a space between the first edge of the first light shielding part and the third edge of the corresponding first space area is 0.8 μm to 1.5 μm, and
a space between the second edge of the first light shielding part and the fourth edge of the corresponding first space area is 0.8 μm to 1.5 μm.

8. The display panel according to claim 1, wherein
the array structure layer further comprises an active semiconductor layer and a source-drain electrode layer, wherein the source-drain electrode layer comprises a source electrode and a drain electrode, the insulating layer is provided with a first via, and the reflective unit is connected to the drain electrode through the first via;
the first substrate comprises a first base substrate and a black matrix layer and a color filter layer which are sequentially disposed on the first base substrate; and at least one of the first substrate and the second substrate further includes a spacer; and
the black matrix layer comprises at least one first black matrix and at least one second black matrix, an orthographic projection of the at least one first black matrix on the first base substrate covers an orthographic projection of the spacer on the first base substrate; an orthographic projection of the at least one second black matrix on the first base substrate covers an orthographic projection of the first via on the first base substrate.

9. The display panel according to claim 1, wherein the first substrate further comprises a first polarizer disposed on a side of the first substrate away from the second substrate, and the first polarizer comprises a first quarter-wave plate, a second adhesive layer, a half-wave plate, a third adhesive layer, a first cellulose triacetate layer, a first poly vinyl alcohol layer, and a second cellulose triacetate layer which are sequentially arranged along a direction away from the second substrate, wherein
an absorption axis angle of the first poly vinyl alcohol layer is n°, a slow axis angle of the half-wave plate is ((n+21)%180)° to ((n+23)%180)°, a slow axis angle of the first quarter-wave plate is ((n+142)%180)° to ((n+144)%180)°, and n is between 0 and 180, wherein % 180 is a symbol for a modulo operator, which means that a result from an expression inside a parentheses before the symbol is divided by 180 and a remainder is returned.

10. The display panel according to claim 1, wherein the second substrate further comprises a second polarizer disposed on a side of the second substrate away from the first substrate, and the second polarizer comprises a second quarter-wave plate, a fourth adhesive layer, a third cellulose triacetate layer, a second poly vinyl alcohol layer, and a fourth cellulose triacetate layer which are sequentially arranged along a direction away from the first substrate, wherein
an absorption axis angle of the second poly vinyl alcohol layer is ((n+89)%180)° to ((n+91)%180)°, and a slow axis angle of the second quarter-wave plate is ((n+139)%180)° to ((n+141)%180)°, wherein % 180 is a symbol for a modulo operator, which means that a result from an expression inside a parentheses before the symbol is divided by 180 and a remainder is returned.

11. The display panel according to claim 1, further comprising a touch structure layer disposed on a side of the first substrate away from the second substrate; wherein
in a plane parallel to the display panel, the display panel comprises a touch control area and a binding area located at the second direction side of the touch control area,
the touch control area comprises N electrode areas and N lead areas,
the electrode area and the lead area both extend along the second direction,
the electrode area and the lead area are alternately arranged along the first direction,
each of the electrode areas comprises M touch electrodes arranged sequentially along the second direction,
each of the lead areas comprises M touch traces arranged sequentially along the first direction,
a first end of each of the touch traces is connected with one of the touch electrodes, and
a second end extends to the binding area along the second direction, wherein both M and N are natural numbers greater than 1.

12. A display device, comprising the display panel according to claim 1.

13. A preparation method of the display panel according to claim 1, comprising:
forming a first substrate and a second substrate respectively, wherein the second substrate comprises a shielding layer, an array structure layer, an insulating layer and a reflective layer which are sequentially disposed on the second base substrate, wherein the array structure layer comprises a gate electrode layer, and the gate electrode layer comprises a plurality of gate lines; the shielding layer comprises a plurality of groups of light shielding units sequentially arranged along a first direction, each group of the light shielding units comprises a plurality of independent sub-light shielding units sequentially arranged along a second direction, the sub-light shielding units extends along the second direction extend, and the first direction intersects with the second direction; the reflective layer comprises a plurality of reflective units arranged in an array along the first direction and the second direction, the plurality of reflective units form a plurality of reflective rows and a plurality of reflective columns, a space area between adjacent reflective columns forms a first space area, and a space area between adjacent reflective rows forms a second space area; the first space area comprises a first sub-region and a second sub-region, an orthographic projection of the first sub-region on the second base substrate is overlapped with an orthographic projection of a spacing area between two adjacent sub-light shielding units in each group on the second base substrate, and an orthographic projection of the second sub-region on the second base substrate is not overlapped with an orthographic projection of a space area between two adjacent sub-light shielding unit in each group on the second base substrate; and cell-assembling the first substrate and the second substrate, and filling liquid crystal between the first substrate and the second substrate.

14. A display panel, comprising: a first substrate and a second substrate disposed oppositely, and a liquid crystal layer sandwiched between the first substrate and the second substrate, wherein the first substrate comprises a first polarizer disposed on a side of the first substrate away from the second substrate, and the first polarizer comprises a first quarter-wave plate, a second adhesive layer, a half-wave plate, a third adhesive layer, a first cellulose triacetate layer, a first poly vinyl alcohol layer, and a second cellulose triacetate layer which are sequentially arranged along a direction away from the second substrate, wherein an absorption axis angle of the first poly vinyl alcohol layer is n°, a slow axis angle of the half-wave plate is $((n+21)\%180)°$ to $((n+23)\%180)°$, a slow axis angle of the first quarter-wave plate is $((n+142)\%180)°$ to $((n+144)\%180)°$, and n is between 0 and 180, wherein % 180 is a symbol for a modulo operator, which means that a result from an expression inside a parentheses before the symbol is divided by 180 and a remainder is returned.

15. The display panel according to claim 14, wherein the second substrate further comprises a second polarizer disposed on a side of the second substrate away from the first substrate, and the second polarizer comprises a second quarter-wave plate, a fourth adhesive layer, a third cellulose triacetate layer, a second poly vinyl alcohol layer, and a fourth cellulose triacetate layer which are sequentially arranged along a direction away from the first substrate, wherein an absorption axis angle of the second poly vinyl alcohol layer is $((n+89)\%180)°$ to $((n+91)\%180)°$, and a slow axis angle of the second quarter-wave plate is $((n+139)\%180)°$ to $((n+141)\%180)°$.

16. A preparation method of the display panel according to claim 14, comprising:

forming a first substrate and a second substrate respectively, cell-assembling the first substrate and the second substrate, and filling liquid crystal between the first substrate and the second substrate; and attaching a first polarizer to a side of the first substrate away from the second substrate, wherein the first polarizer comprises a first quarter-wave plate, a second adhesive layer, a half-wave plate, a third adhesive layer, a first cellulose triacetate layer, a first poly vinyl alcohol layer, and a second cellulose triacetate layer which are sequentially arranged along a direction away from the second substrate, wherein an absorption axis angle of the first poly vinyl alcohol layer is n°, a slow axis angle of the half-wave plate is $((n+21)\%180)°$ to $((n+23)\%180)°$, a slow axis angle of the first quarter-wave plate is $((n+142)\%180)°$ to $((n+144)\%180)°$, and n is between 0 and 180.

* * * * *